US011763600B2

(12) United States Patent
Miyake et al.

(10) Patent No.: US 11,763,600 B2
(45) Date of Patent: Sep. 19, 2023

(54) NON-TRANSITORY COMPUTER-READABLE MEDIUM AND FACE AUTHENTICATION SYSTEM INCLUDING FACE AUTHENTICATION PROGRAM

(71) Applicant: SQUARE ENIX CO., LTD., Tokyo (JP)

(72) Inventors: Youichiro Miyake, Tokyo (JP); Yuya Nagai, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 181 days.

(21) Appl. No.: 17/369,212

(22) Filed: Jul. 7, 2021

(65) Prior Publication Data

US 2022/0012473 A1 Jan. 13, 2022

(30) Foreign Application Priority Data

Jul. 8, 2020 (JP) ................................. 2020-117976

(51) Int. Cl.
*G06V 40/16* (2022.01)
*G06T 7/70* (2017.01)
*G06V 40/50* (2022.01)

(52) U.S. Cl.
CPC .............. *G06V 40/172* (2022.01); *G06T 7/70* (2017.01); *G06V 40/161* (2022.01); *G06V 40/50* (2022.01); *G06T 2207/30201* (2013.01)

(58) Field of Classification Search
CPC . G06T 2207/30201; G06T 7/70; G06V 10/75; G06V 10/82; G06V 40/161; G06V 40/172; G06V 40/50
See application file for complete search history.

(56) References Cited

U.S. PATENT DOCUMENTS

| 2009/0161921 A1* | 6/2009 | Ohnishi | ............... | G06V 40/172 |
| | | | | 382/115 |
| 2014/0181989 A1* | 6/2014 | Sako | ..................... | H04W 4/029 |
| | | | | 726/26 |

(Continued)

FOREIGN PATENT DOCUMENTS

| JP | 6684009 B1 | 3/2020 |
| JP | 2020071814 A | 5/2020 |

(Continued)

OTHER PUBLICATIONS

A machine translated English version of JP2020-87305.*

(Continued)

*Primary Examiner* — Ruiping Li
(74) *Attorney, Agent, or Firm* — Dorsey & Whitney LLP

(57) ABSTRACT

A non-transitory computer-readable medium including a face authentication program for causing a computer device that executes face authentication using a plurality of face information registered in a storage unit with respect to a captured face image of a user to implement the following functions including a determination function of determining face information to be used for the face authentication from among the plurality of face information based on position estimation information of a user corresponding to each of the plurality of face information, which is registered in the storage unit in association with each of the plurality of face information, and a predetermined condition, and an authentication function of performing the face authentication using the determined face information with respect to the captured face image of the user.

8 Claims, 25 Drawing Sheets

(56) References Cited

U.S. PATENT DOCUMENTS

2020/0143612 A1\* 5/2020 Nakao ...................... G07C 9/38
2021/0304543 A1  9/2021 Nakao et al.

FOREIGN PATENT DOCUMENTS

JP  2020-87305   \* 6/2020
WO  2010103735 A1  9/2010

OTHER PUBLICATIONS

Japanese Office Action for Reasons of Refusal dated Sep. 28, 2021 for Japanese Application No. 2020-117976, with English translation; pp. all.

\* cited by examiner

FIG.10

REGISTRATION DATA

| USER ID | NAME | FACE INFORMATION | TICKET TYPE | FIRST IMAGING TIME | FIRST IMAGING POSITION |
|---|---|---|---|---|---|
| 0001 | KEN SUZUKI | *** | ENTRANCE | 10:20 | 20C |
| 0002 | *** | *** | ALL ATTRACTION | 10:59 | 201C |
| 0003 | *** | *** | ATTRACTION 80C,81C,82C | 10:30 | 201C |
| 0004 | *** | *** | *** | *** | *** |
| 0005 | *** | *** | ALL ATTRACTION | 10:00 | 20C |
| 0006 | *** | *** | ALL ATTRACTION | 10:30 | 20C |

REQUIRED TIME DATA

| DEVICE ID-1 | DEVICE ID-2 | REQUIRED TIME |
|---|---|---|
| 20C | 201C | 15 min. |
| 20C | 202C | 18 min. |
| 20C | 203C | 5 min. |
| 20C | 204C | 8 min. |
| 20C | 205C | 5 min. |
| 201C | 202C | 5 min. |
| 201C | 203C | 5 min. |
| 201C | 204C | 8 min. |
| 201C | 205C | 15 min. |

| USER ID | NAME | FACE INFORMATION | REGISTRATION DATA PROGRESS | FIRST IMAGING TIME | FIRST IMAGING POSITION |
|---|---|---|---|---|---|
| 0001 | KEN SUZUKI | *** | 20D, RETIREMENT | 10:40 | 205D |
| 0002 | *** | *** | 20C, 201D | 11:15 | 201D |
| 0003 | *** | *** | 20D, 204D, 205D | 11:45 | 204D |
| 0004 | *** | *** | *** | *** | *** |
| 0005 | *** | *** | 20D | 09:45 | 20D |
| 0006 | *** | *** | 20D, 201D, 202D, 203D, 204D, 205D, GAME CLEARING | 10:40 | 203D |
| 0007 | *** | *** | 20D, 202D, 203D | 10:30 | 202D |
| ... | | | | | |

FIG.22

REQUIRED TIME DATA

| DEVICE ID-1 | DEVICE ID-2 | REQUIRED TIME |
|---|---|---|
| 20D | 201D | 30 min. |
| 20D | 202D | 20 min. |
| 20D | 203D | 30 min. |
| 20D | 204D | 15 min. |
| 20D | 205D | 10 min. |
| 201D | 202D | 25 min. |
| 201D | 203D | 10 min. |
| 201D | 204D | 30 min. |
| 201D | 205D | 15 min. |

NON-TRANSITORY COMPUTER-READABLE MEDIUM AND FACE AUTHENTICATION SYSTEM INCLUDING FACE AUTHENTICATION PROGRAM

CROSS-REFERENCE TO RELATED APPLICATION(S)

This application claims priority to and the benefit of Japanese Patent Application No. 2020-117976, filed on Jul. 8, 2020, the disclosure of which is expressly incorporated herein by reference in its entirety for any purpose.

BACKGROUND

At least one of the embodiments of the present invention relates to a non-transitory computer-readable medium and a face authentication system including a face authentication program.

A system (face authentication system) for performing face authentication by capturing the face of a person is used, for example, for determining entrance permission for facilities such as amusement parks, attractions in the facilities, and the like. In face authentication, face information registered in advance is collated by detecting facial features from the captured face image of a person. Examples of such face authentication may be found in Japanese Patent No. 6684009. In recent years, face authentication may be performed using deep learning of artificial intelligence technology.

SUMMARY

In the above-described face authentication system, since all the face information registered in advance is collated, it is a problem that face authentication takes much time. The more face information registered in advance, the longer the time required for face authentication.

An object of at least one embodiment of the present disclosure is to solve a shortage of related technology.

From a non-limiting viewpoint, a non-transitory computer-readable medium according to an embodiment of the present disclosure includes a face authentication program for causing a computer device that executes face authentication using a plurality of face information registered in a storage unit with respect to a captured face image of a user to implement the following functions including a determination function of determining face information to be used for the face authentication from among the plurality of face information based on position estimation information of a user corresponding to each of the plurality of face information, which is registered in the storage unit in association with each of the plurality of face information, and a predetermined condition, and an authentication function of performing the face authentication using the determined face information with respect to the captured face image of the user.

From a non-limiting viewpoint, a non-transitory computer-readable medium according to an embodiment of the present disclosure includes a face authentication program for causing a server device, which is connected to a terminal device having an imaging unit by a communication network and executes face authentication of a user using a plurality of face information registered in a storage unit with respect to a face image of the user captured by the terminal device, to implement the following functions including a determination function of determining face information to be used for the face authentication from among the plurality of face information based on position estimation information of a user corresponding to each of the plurality of face information, which is registered in the storage unit in association with each of the plurality of face information, and a predetermined condition, and an authentication function of performing the face authentication using the determined face information with respect to the captured face image of the user.

From a non-limiting viewpoint, a face authentication system according to an embodiment of the present disclosure includes a terminal device having an imaging unit and a server device connected to the terminal device by a communication network, and executes face authentication of a user using a plurality of face information registered in a storage unit with respect to a face image of the user captured by the terminal device, the face authentication system including a decider configured to determine face information to be used for the face authentication from among the plurality of face information based on position estimation information of a user corresponding to each of the plurality of face information, which is registered in the storage unit in association with each of the plurality of face information, and a predetermined condition, and an authenticator configured to perform the face authentication using the determined face information with respect to the captured face image of the user.

Each embodiment of the present application solves one or more shortages.

BRIEF DESCRIPTION OF THE DRAWINGS

FIG. 10 is a diagram showing an example of registration data corresponding to at least one of the embodiments of the present disclosure.

FIG. 11 is a diagram showing an example of required time data corresponding to at least one of the embodiments of the present disclosure.

FIG. 21 is a diagram showing an example of registration data corresponding to at least one of the embodiments of the present disclosure.

FIG. 22 is a diagram showing an example of required time data corresponding to at least one of the embodiments of the present disclosure.

DETAILED DESCRIPTION

Hereinafter, examples of embodiments of the present disclosure will be described with reference to the drawings. The various components in the examples of each embodiment described below can be appropriately combined as long as there is no contradiction or the like. In addition, the contents described as an example of a certain embodiment may be omitted in the other embodiments. The contents of operations and processing not related to the characteristic parts of each embodiment may be omitted. Further, an order of the various processing constituting the various flows described below is in no particular order as long as there is no contradiction or the like in the processing contents.

First Embodiment

Figure 1:
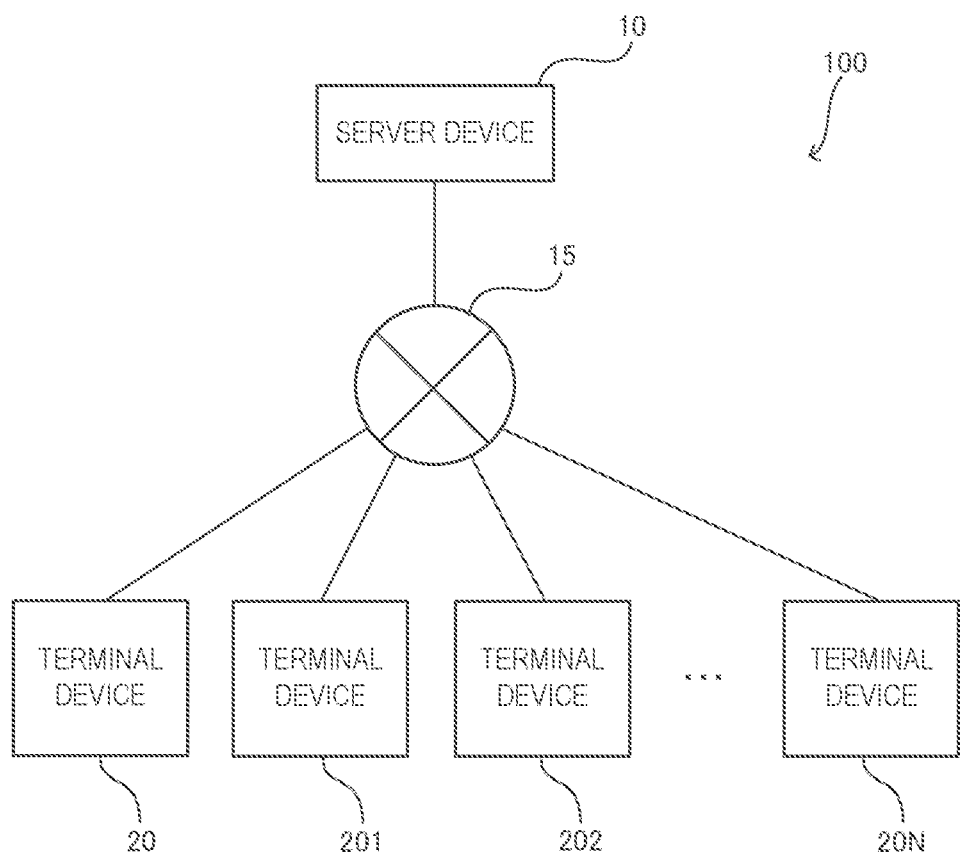
FIG. 1 is a block diagram showing an example of a configuration of a face authentication system corresponding to at least one of the embodiments of the present disclosure.

FIG. 1 is a block diagram showing an example of a configuration of a face authentication system 100 according to the embodiment of the present disclosure. As shown in FIG. 1, the face authentication system 100 includes a server device 10 and a plurality of terminal devices 20 and 201 to 20N (N is a random integer). The server device 10 and the plurality of terminal devices 20 and 201 to 20N are each connected to a communication network 15 such as the Internet. A configuration of the face authentication system 100 is not limited to this, and may be, for example, a configuration including a plurality of server devices or a configuration without a server device.

The face authentication system 100 has various functions for executing face authentication using a plurality of registered face information for a face image of a user captured by any of the terminal devices 20 and 201 to 20N. The face authentication system 100 of the example of the present embodiment is applied to, for example, an attraction facility such as amusement parks or migratory game events. In the attraction facility, face authentication is used to determine, for example, whether or not a user (visitor) can enter the facility and whether or not a user can use (ride) each attraction in the facility. In addition, in the migratory game event, for example, face authentication is used to determine whether or not a user (player) can pass (reach) a check point. The migratory game event is, for example, an event in which the user passes (migrates) through all the check points provided in a game field in the real space.

The face authentication means to confirm (identify) the legitimacy of the user by using the face image of the user. That is, in the face authentication, it is determined whether or not the user of the captured face image is a user whose face information is registered. For example, in an attraction facility, when face information acquired from the captured face image of the user matches any of the registered face information, the user is permitted to enter the facility as a legitimate visitor.

The server device 10 is managed by an administrator of the game system, and has various functions for providing information on the progress of the face authentication to the terminal devices 20 and 201 to 20N. The server device 10 provides, for example, the result of the face authentication. In the example of the present embodiment, the server device 10 is configured by an information processing device such as a WWW server to provide information on the face authentication, and includes one or more storage media (storage units) for storing various information. In addition, the server device 10 also includes a control unit and the like composed of a CPU and the like. Since the above-described configuration is a general configuration, detailed description thereof will be omitted. The storage unit may have a configuration built in the server device 10 or may be a storage device such as a database device separate from the server device 10.

Figure 2:
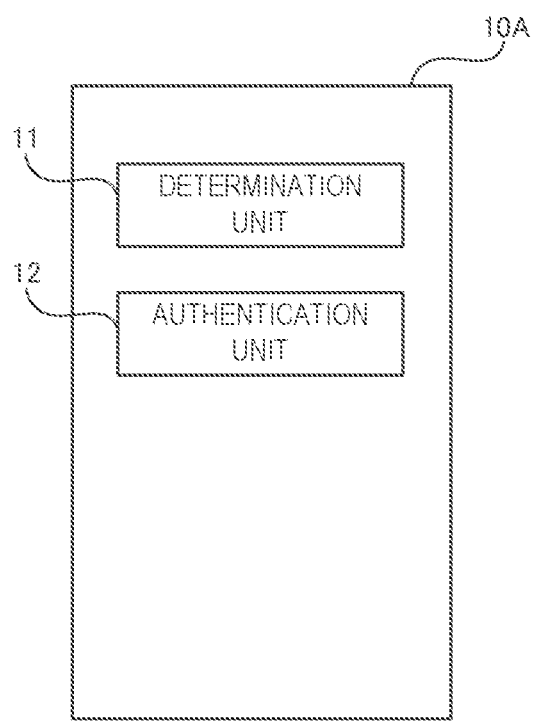
FIG. 2 is a functional block diagram showing a configuration of a server device corresponding to at least one of the embodiments of the present disclosure.

FIG. 2 is a functional block diagram showing a configuration of a server device 10A, which is an example of the configuration of the server device 10. The server device 10A includes at least a determination unit 11 and an authentication unit 12 by executing software (a face authentication processing program) for the control unit to execute the face authentication stored in the storage unit. The face authentication program also includes control data used in face authentication processing.

The determination unit (determination function) 11 determines the face information used for face authentication from among a plurality of face information registered in the storage unit based on the position estimation information and predetermined conditions. The "position estimation information" is information for estimating a current position of each user of the plurality of face information registered in the storage unit. The position estimation information is associated with each of the plurality of face information and registered in the storage unit of the server device 10A.

The position estimation information includes, for example, information on a position (imaging position) and a time (imaging time) at which the face image of the user is captured. For example, in a terminal device of any one of the terminal devices 20 and 201 to 20N, an imaging time and an imaging position (position of the terminal device) when a face image is captured for the face authentication are registered as the position estimation information. For example, the latest information obtained by capturing the face image of the user is registered as the position estimation information. In addition, as the position estimation information, for example, there is information on a ticket type possessed by the user in the attraction facility. Further, as the position estimation information, there is information on check points which the user have passed in the migratory game event.

The predetermined condition is, for example, a condition in which face information of a user who is estimated not to be at the imaging position at the imaging time of the face image for which the face authentication is performed is excluded from the target of the face authentication. In the case of the example, the determination unit 11 determines face information remaining after excluding face information in which predetermined conditions are satisfied from among the plurality of face information registered in the storage unit as the face information to be used for the face authentication.

For example, a case where face authentication of a user A1 is performed from now on immediately after a face image of the user A1 is captured by the terminal device 20 will be described. An imaging position of the user A1 is a position of the terminal device 20. Here, a user B1 different from the user A1 has the face information and the position estimation information registered in the storage unit. The position estimation information of the user B1 includes an imaging time 10 minutes before the current time and an imaging position which is a position of a terminal device 201. That is, it is specified that the face image of the user B1 was, for face authentication or the like, captured by the terminal device 201 10 minutes before. Since an estimated time required for the user B1 to move from the terminal device 201 to the terminal device 20 is 30 minutes, it is estimated that the user B1 did not exist in (could not move to) the terminal device 20 when the face image of the user A1 was captured. Therefore, the face information of the user B1 is excluded from the face information used for the face authentication of the user A1 to be performed from now on. In this case, the time (required time) estimated to be required for the user to move between the terminal devices 20 and 201 to 20N may be registered in advance in the storage unit of the server device 10A, for example.

The authentication unit (authentication function) 12 executes the face authentication on the face image of the user captured by the terminal devices 20 and 201 to 20N by using the determined face information. For example, the authentication unit 12 acquires face information from the captured face image of the user and performs the face authentication by collating the face information with the determined face information. The "face information" is information on a face image, such as a position of feature points such as eyes, nose, and mouth of the face in the face image, a feature amount such as a distance between feature points, and a feature vector of the face image. The face information is acquired from, for example, a face image.

Next, the terminal devices 20 and 201 to 20N will be described. Each of the terminal devices 20 and 201 to 20N is installed in, for example, a different place. The terminal devices 20 and 201 to 20N are composed of a terminal device having an imaging unit and capable of accepting execution of face authentication from a user. The terminal devices 20 and 201 to 20N are, for example, personal computers having the imaging unit.

Each terminal device 20 and 201 to 20N includes the imaging unit, an operation device (operation unit), a storage medium (storage unit), a control unit composed of a CPU, a display unit, a communication control unit, and the like. Since the above-described configuration is a general configuration, detailed description thereof will be omitted. In addition, software (face authentication acceptance program) for accepting execution of face authentication is stored in the storage units of the terminal devices 20 and 201 to 20N. By executing the above program, the terminal devices 20 and 201 to 20N, for example, capture the face image of the user and transmit information such as the captured face image to the server device 10 together with a face authentication request. Further, the terminal devices 20 and 201 to 20N receive a face authentication result (authentication result) from the server device 10A and display the result on the display unit.

Next, as an example of a configuration of the face authentication system 100, an operation of a face authentication system 100A including the server device 10A and the plurality of terminal devices 20 and 201 to 20N will be described.

Figure 3:
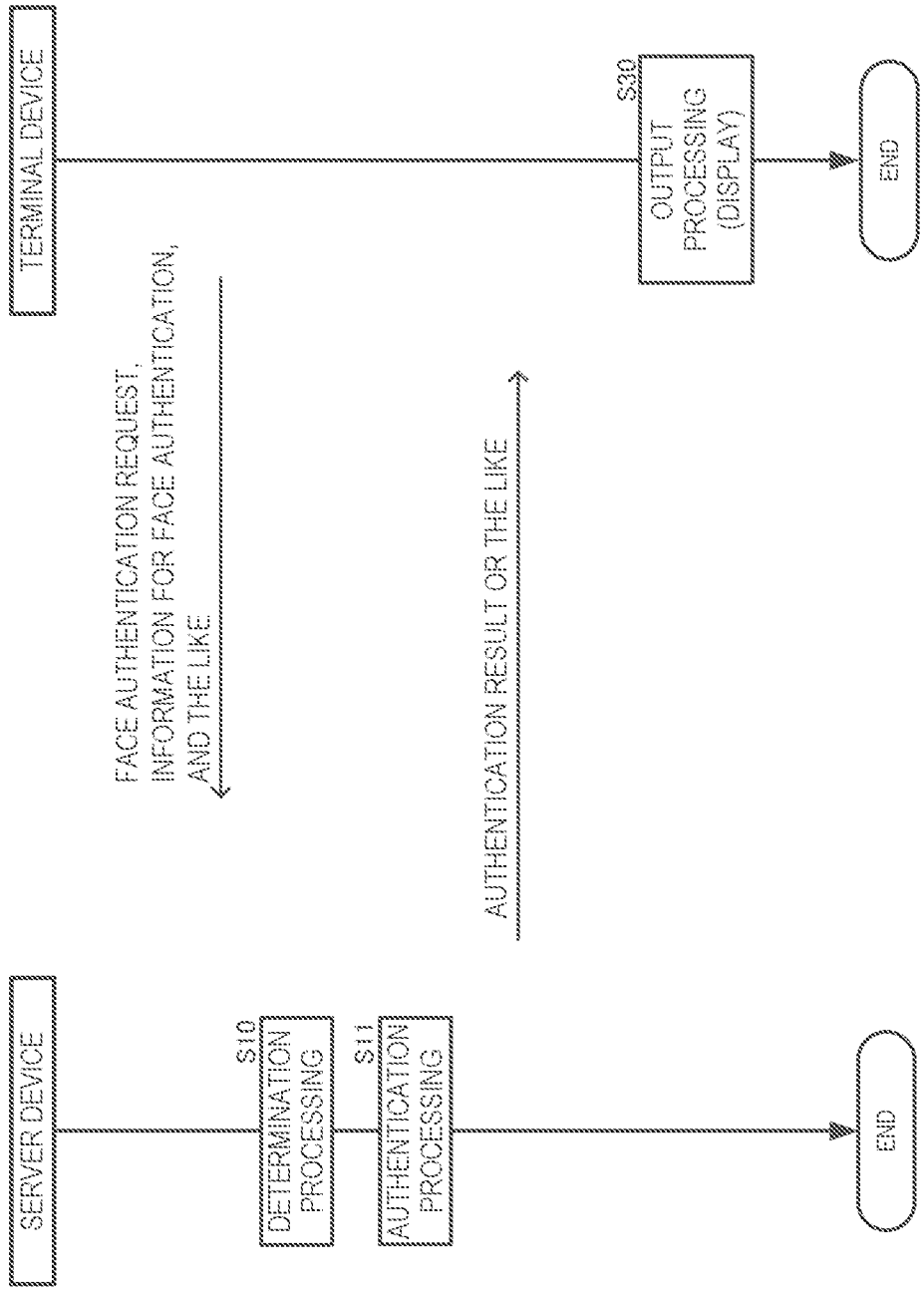
FIG. 3 is a flowchart showing an example of face authentication processing corresponding to at least one of the embodiments of the present disclosure.

FIG. 3 is a flowchart showing an example of the face authentication processing executed by the face authentication system 100A. In the face authentication processing in the example of the present embodiment, processing for determining face information used for face authentication and executing the face authentication is performed. FIG. 3 mainly describes processing of determining face information and processing of collating face information, and some other processing may be omitted. Hereinafter, a case where the server device 10A and the terminal device 20 execute the face authentication processing will be described as an example.

The face authentication processing of the example of the present embodiment is executed when, for example, the face authentication request is received from any of the terminal devices 20 and 201 to 20N.

The terminal device 20 transmits, for example, information for face authentication such as the captured face image to the server device 10A together with the face authentication request.

The server device 10A executes the determination processing (step S10). In the determination processing, the face information used for face authentication is determined from among a plurality of face information registered in the storage unit based on the position estimation information and predetermined conditions. As in the above-described example, the face information remaining after excluding the face information for which a predetermined condition is satisfied is determined as the face information used for face authentication.

Next, the server device 10A executes the authentication processing (step S11). In the authentication processing, the face authentication is executed on the face image received from the terminal device 20 by using the determined face information. As in the above-described example, the face information is acquired from the captured face image of the user and collated with the determined face information. In the collation, when the face information of the captured face image of the user matches any of the determined face information, the server device 10A determines that the user of the received face image is a legitimate user whose face information is registered in the storage unit. In addition, in the authentication processing, the server device 10A transmits, for example, an authentication result and the like to the terminal device 20. Since the processing of collating the face information is a general configuration, a detailed description thereof will be omitted.

After that, the server device 10A ends the face authentication processing. On the other hand, the terminal device 20 outputs (displays on the display unit) an image based on the received authentication result (step S30). After that, the terminal device 20 ends the face authentication processing. In addition, the same processing as that of the terminal device 20 is performed in the other terminal devices 201 to 20N.

As described above, as one aspect of a first embodiment, since the server device 10A is configured to include the determination unit 11 and the authentication unit 12, face information used for face authentication is determined based on predetermined conditions or the like. Accordingly, since face authentication is not performed using all of the plurality of face information registered at all times, the time required for the face authentication is reduced.

Figure 4:
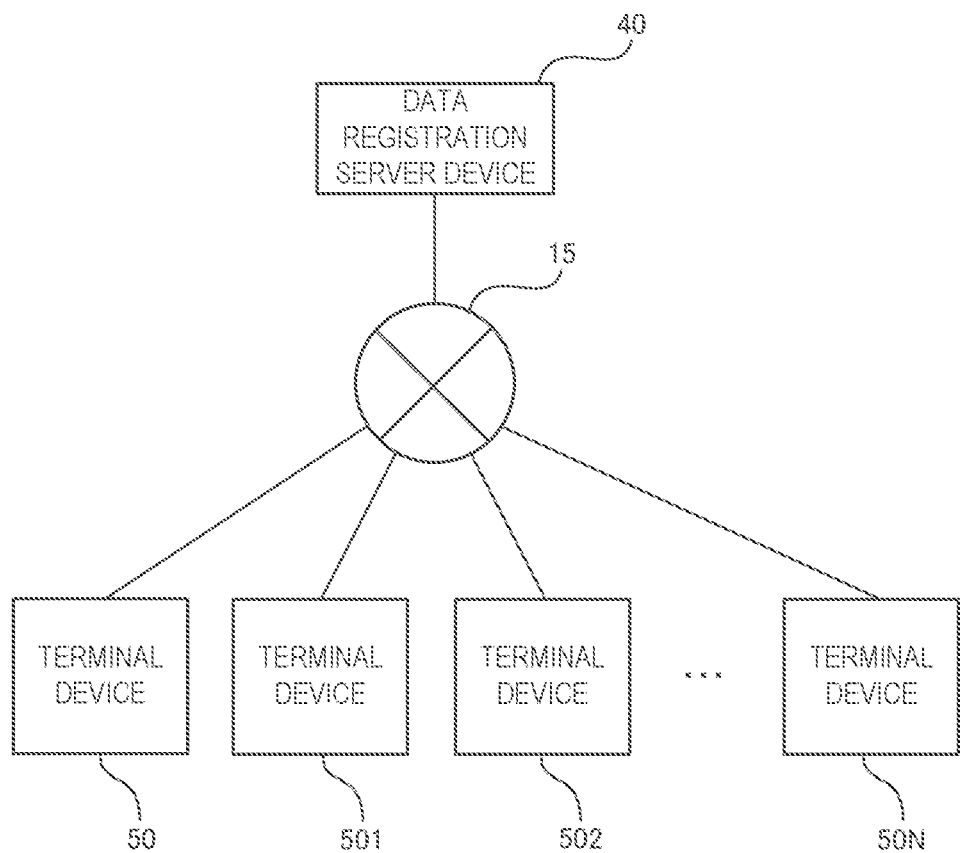
FIG. 4 is a block diagram showing an example of a configuration of a face authentication system corresponding to at least one of the embodiments of the present disclosure.

In the example of the above-described first embodiment, the server device 10A performs face authentication, but the present invention is not particularly limited to this. For example, as shown in FIG. 4, the face authentication system may include a plurality of terminal devices 50 and 501 to 50N, and instead of the server device 10A, each of the terminal devices 50 and 501 to 50N may include at least the determination unit 11 and the authentication unit 12.

The terminal devices 50 and 501 to 50N are, for example, personal computers having an imaging unit, as in the above-described terminal devices 20 and 201 to 20N. Each terminal device 50 and 501 to 50N includes the imaging unit, the operation device (operation unit), the storage medium (storage unit), the control unit composed of the CPU, the display unit, the communication control unit, and the like. Since the above-described configuration is a general configuration, detailed description thereof will be omitted.

Software for executing face authentication (face authentication processing program), software for accepting execution of face authentication (face authentication acceptance program), and the like are stored in the storage units of the terminal devices 50 and 501 to 50N. That is, the terminal devices 50 and 501 to 50N accept the execution of face authentication from the user and execute the face authentication.

In the storage units of the terminal devices 50 and 501 to 50N, the same information as a plurality of face information and position estimation information managed by a data registration server device 40 is registered. The data registration server device 40 is connected to the terminal devices 50 and 501 to 50N via a communication network, for example, and registers and updates the face information of the user and the position estimation information in its own storage unit. In addition, the data registration server device 40 transmits updated information to the terminal devices 50 and 501 to 50N each time the face information and the position estimation information of the user in its own storage unit are updated. The data registration server device 40 does not execute the face authentication.

Figure 5:
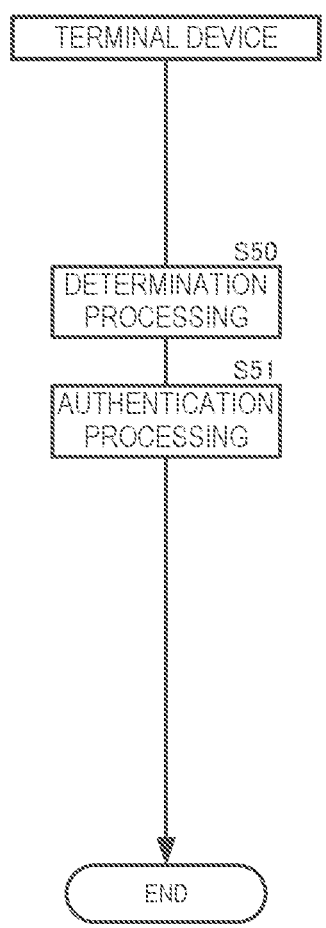
FIG. 5 is a flowchart showing an example of operation of a terminal device when the terminal device corresponding to at least one of the embodiments of the present disclosure executes face authentication processing.

FIG. 5 is a flowchart showing an example of an operation of the terminal device 50 when the terminal device 50 executes the face authentication processing shown in FIG. 3. For example, when the terminal device 50 accepts the execution of the face authentication, the terminal device 50 captures a face image of the user.

In the face authentication processing, the terminal device 50 executes a determination processing (step S50). In the determination processing, the face information used for face authentication is determined from among a plurality of face information registered in the storage unit based on the position estimation information and predetermined conditions. Next, the terminal device 50 executes the authentication processing (step S51). In the authentication processing, face authentication is executed on the captured face image using the determined face information. Further, in the authentication processing, the terminal device 50 displays, for example, an authentication result on the display unit. After that, the terminal device 50 ends the face authentication processing.

The data registration server device 40 may not be provided. In this case, a shared storage unit is provided, and each of the terminal devices 50 and 501 to 50N may refer to, for example, face information and position estimation information of the shared storage unit. In addition, in the example shown in FIG. 4, a plurality of terminal devices 50 and 501 to 50N are described, but the embodiment of the present disclosure may be applied to a single terminal device.

In the example of the above-described embodiment, a plurality of face information is registered in the storage unit of the server device, but the registration of the face information may be accepted by, for example, the terminal device. Specifically, the terminal device may capture the face image of the user and transmit the face image to the server device together with the face registration request. In addition, the server device may generate face information from the face image based on the face registration request and register the face information in the storage unit.

In the example of the above-described embodiment, as an example of the predetermined condition, a condition has been described in which the face information of the user who is estimated not to be at the imaging position at the imaging time of the face image for which the face authentication is performed is excluded from the target of the face authentication, but the present invention is not particularly limited to this. As long as it is a condition that can be determined to be satisfied by using the position estimation information, it may be applied as a predetermined condition. Further, for example, as the predetermined condition, the face information of the user who is estimated to be at the imaging position at the imaging time of the face image for which the face authentication is performed may be a condition to be the target of the face authentication.

Second Embodiment

Figure 6:
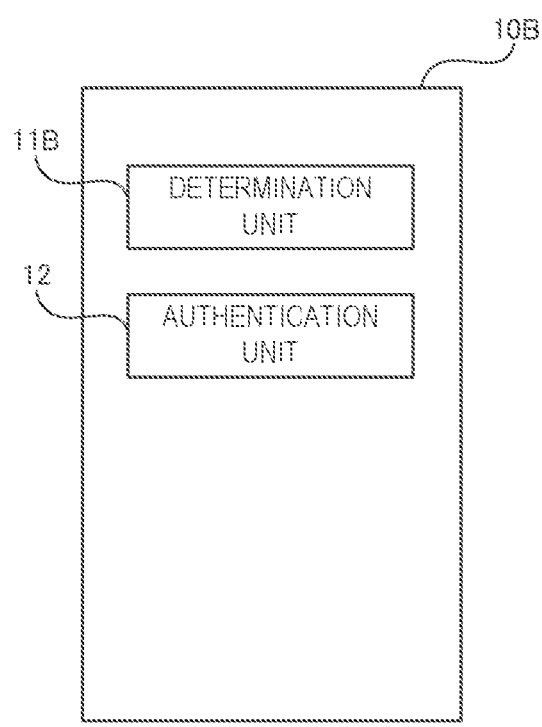
FIG. 6 is a functional block diagram showing a configuration of a server device corresponding to at least one of the embodiments of the present disclosure.

In the example of the present embodiment, a face authentication system 100B, which is an example of the face authentication system 100, will be described. The face authentication system 100B includes a server device 10B and a plurality of terminal devices 20 and 201 to 20N. FIG. 6 is a block diagram showing a configuration of the server device 10B, which is an example of the server device 10. In the example of the present embodiment, the server device 10B includes at least a determination unit 11B and the authentication unit 12.

The determination unit 11B determines the face information used for face authentication from among a plurality of face information registered in the storage unit based on the position estimation information and predetermined conditions. The position estimation information is associated with each of the plurality of face information and registered in the storage unit of the server device 10B. The position estimation information includes, for example, information on a position (imaging position) and a time (imaging time) at which the face image of the user is captured. For example, in a terminal device of any one of the terminal devices 20 and 201 to 20N, an imaging time and an imaging position (position of the terminal device) when a face image is captured for the face authentication are registered as the position estimation information. For example, the latest information obtained by capturing the face image of the user is registered as the position estimation information. In addition, as the position estimation information, for example, there is information on a ticket type possessed by the user in the attraction facility.

The predetermined condition of the example of the present embodiment is a condition in which the face information of the user who is estimated not to be at the imaging position at the imaging time of the face image for which the face authentication is performed is excluded from the target of the face authentication. Accordingly, the determination unit 11B determines face information remaining after excluding face information in which predetermined conditions are satisfied from among the plurality of face information registered in the storage unit as the face information to be used for the face authentication.

For example, a case where face authentication of a user A1 is performed from now on immediately after a face image of the user A1 is captured by the terminal device 20 will be described. An imaging position of the user A1 is a position of the terminal device 20. The user B1 has the face information and the position estimation information registered in the storage unit. The position estimation information of the user B1 includes an imaging time 10 minutes before the current time and an imaging position which is a position of a terminal device 201. That is, it is specified that the face image of the user B1 was, for face authentication or the like, captured by the terminal device 201 10 minutes before. Since the estimated time required for the user B1 to move from the terminal device 201 to the terminal device 20 is 30 minutes, it is estimated that the user B1 did not exist in (could not move to) the terminal device 20 when the face image of the user A1 was captured. Therefore, the face information of the user B1 is excluded from the face information used for the face authentication of the user A1 to be performed from now on. The time (required time) estimated to be required for the user to move between the terminal devices 20 and 201 to 20N may be registered in advance in the storage unit of the server device 10B, for example. In addition, the imaging time and the imaging position of the user A1 are transmitted from the terminal device 20 to the server device 10B, for example. The imaging position may be identification information of the terminal device that has performed capturing.

In addition, for example, in the case of the migratory game event, information on passed check points, information on game clearing and game dropout (retirement), and the like may be used as the position estimation information. For example, a case where the above-described face authentication of the user A1 is performed in the migratory game event will be described. For example, the position estimation information of the user B2 includes the information on game clearing. In this case, since the user B2 who has already cleared the game does not need to move to each check point, it is estimated that the user B2 did not exist in the terminal device 20 at a point in time at which the face image of the user A1 was captured. Therefore, the face information of the user B2 is excluded from the face information used for the face authentication of the user A1 to be performed from now on.

The authentication unit (authentication function) 12 executes the face authentication on the face image of the user captured by the terminal devices 20 and 201 to 20N by using the determined face information. For example, the authentication unit 12 acquires face information from the captured face image of the user and performs the face authentication by collating the face information with the determined face information.

Next, an operation of the face authentication system 100B will be described.

Figure 7:
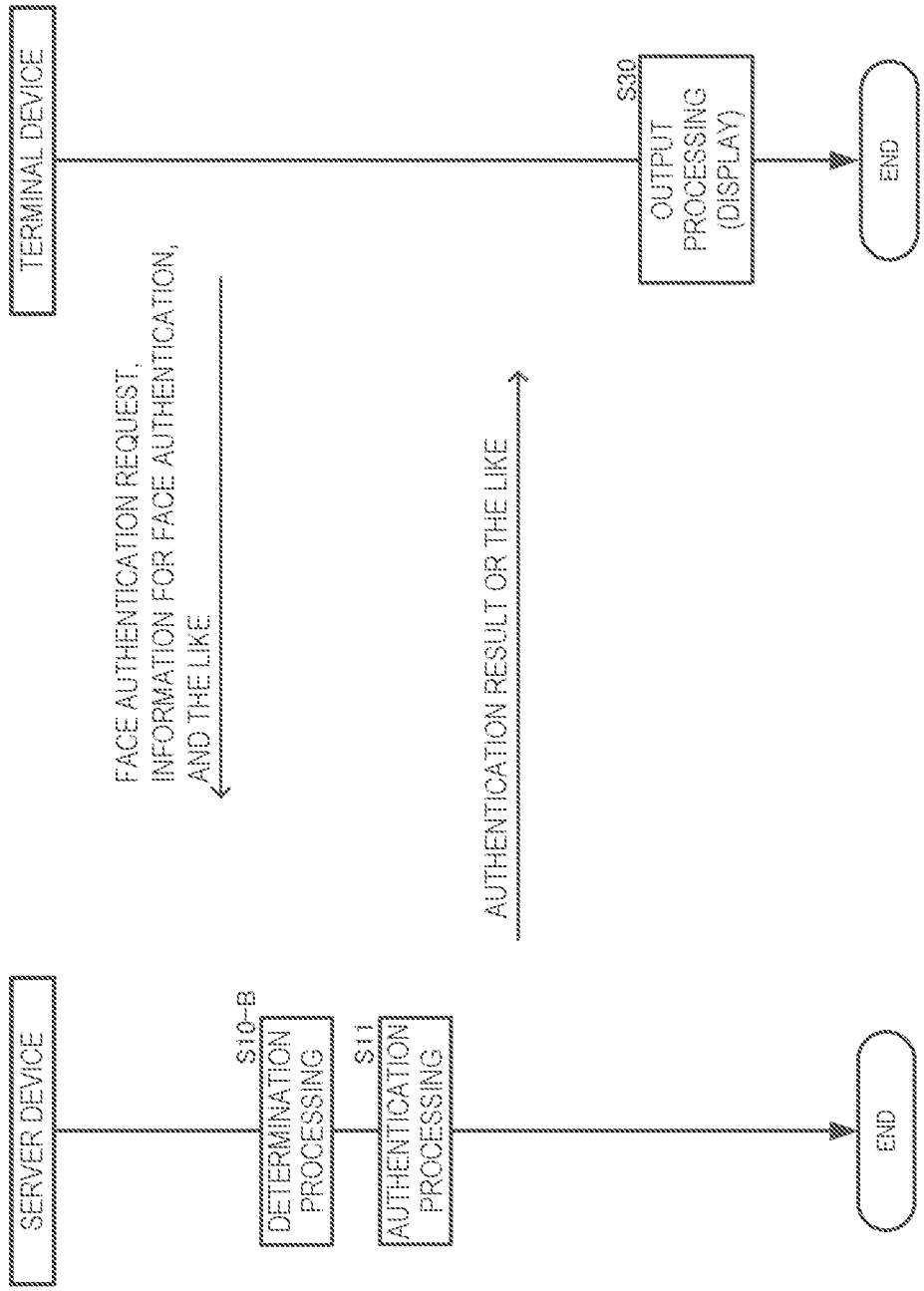
FIG. 7 is a flowchart showing an example of face authentication processing corresponding to at least one of the embodiments of the present disclosure.

FIG. 7 is a flowchart showing an example of the face authentication processing executed by the face authentication system 100B. In the face authentication processing in the example of the present embodiment, processing for determining face information used for face authentication and executing the face authentication is performed. FIG. 7 mainly describes processing of determining face information and processing of collating face information, and some other processing may be omitted. Hereinafter, a case where the server device 10B and the terminal device 20 execute the face authentication processing will be described as an example. The flowchart showing an operation of a system in which the terminal device exemplified in FIG. 5 executes face authentication will be omitted from the viewpoint of avoiding duplicate explanations.

The face authentication processing of the example of the present embodiment is executed when, for example, the face authentication request is received from any of the terminal devices 20 and 201 to 20N.

The terminal device 20 transmits, for example, face authentication information such as a captured face image, an imaging time and an imaging position of the face image, to the server device 10B together with the authentication request.

The server device 10B executes the determination processing (step S10-B). In the determination processing, the face information used for face authentication is determined from among a plurality of face information registered in the storage unit based on the position estimation information and predetermined conditions. As described above, the face information remaining after excluding the face information for which the predetermined condition is satisfied is determined as the face information used for the face authentication. The server device 10B may exclude the face information of the user who is estimated not to be at the imaging position at the imaging time of the received face image from the target of the face authentication based on the position estimation information or the like.

Next, the server device 10B executes the authentication processing (step S11). In the authentication processing, the face authentication is executed on the face image received from the terminal device 20 by using the determined face information. In addition, in the authentication processing, the server device 10B transmits, for example, an authentication result and the like to the terminal device 20.

After that, the server device 10B ends the face authentication processing. On the other hand, the terminal device 20 outputs (displays on the display unit) an image based on the received authentication result (step S30). After that, the terminal device 20 ends the face authentication processing. In addition, the same processing as that of the terminal device 20 is performed in the other terminal devices 201 to 20N.

As described above, as one aspect of a second embodiment, since the server device 10B is configured to include the determination unit 11B and the authentication unit 12, face information used for face authentication is determined based on the predetermined conditions or the like. Accordingly, since face authentication is not performed using all of the plurality of face information registered at all times, the time required for the face authentication is reduced.

Third Embodiment

Figure 8:
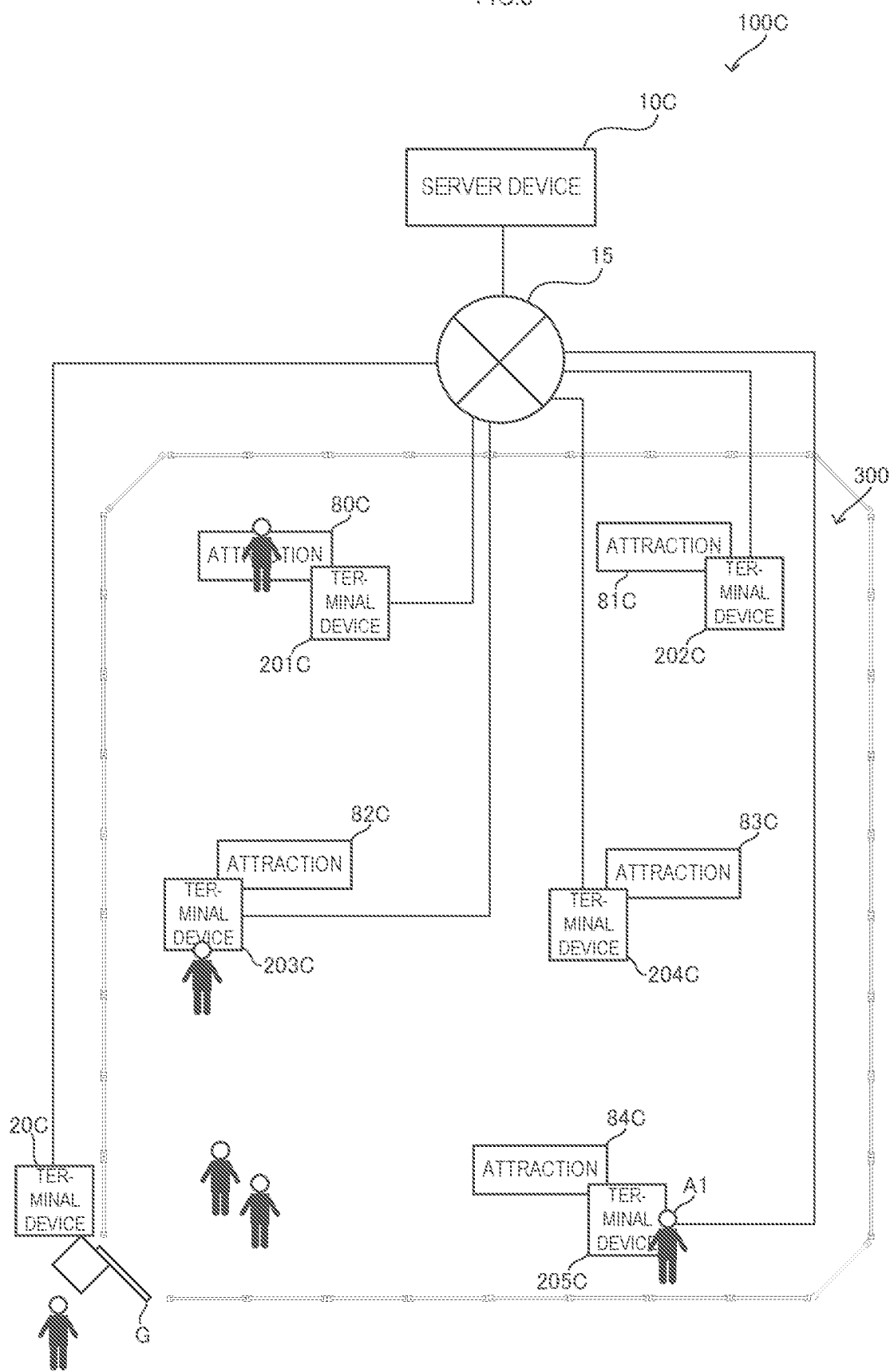
FIG. 8 is a block diagram showing an example of a configuration of a face authentication system corresponding to at least one of the embodiments of the present disclosure.

FIG. 8 is a block diagram showing a configuration of a face authentication system 100C, which is an example of the configuration of the face authentication system 100. In the example of the present embodiment, the face authentication system 100C is disposed in an amusement park (attraction facility) 300 in the real space. The face authentication system 100C includes a server device 10C and a plurality of terminal devices 20C and 201C to 205C. Each of the server device 10C and the plurality of terminal devices 20C and 201C to 205C is connected to a communication network 15 such as the Internet.

In the amusement park 300, a plurality of attractions 80C to 84C such as a Ferris wheel and a roller coaster are disposed. The facilities (regions) of the amusement park 300 are surrounded by fences. The user (visitor) can enter the facility from a gate G, which is the entrance and exit. At the amusement park 300, the face authentication by the face authentication system 100C is used to determine, for example, whether or not the user can enter the facility and whether or not the user can use (ride) each of the attractions 80C to 84C in the facility.

Usage condition of attractions 80C to 84C differ depending on the type of ticket purchased by the user. For example, there are a ticket that permits only entrance into the facility for one day (on the day of use), a ticket that permits unlimited use of all attractions 80C to 84C for one day (on the day of use), and a ticket that permits unlimited use of specific attractions 80C to 82C for one day (on the day of use). The user is free to enter or leave the facility as long as it is the day of use regardless of the ticket.

The user can purchase the ticket, for example, at a ticket vending machine (not shown) disposed around the gate G outside the facility. In addition, the user can also purchase the ticket in advance on a WEB site or the like.

After purchasing the ticket, the user needs to register user own face information (face registration) used for face authentication in advance. The execution of registration of face information is accepted by the terminal device 20C disposed at the gate G. When registering face information, registration of ticket type is also performed. After the registration of the face information is completed, the user is permitted to enter from the gate G. The terminal device 20C also accepts the execution of the face authentication for a user who re-enters the facility, for example. Then, when entrance is permitted by the face authentication, the user is permitted to enter (re-enter) from Gate G.

The user who enters the facility can ride the permitted attractions when the use (riding) is permitted by the face authentication. The terminal devices 201C to 205C are disposed in the vicinity of each of the attractions 80C to 84C. The terminal devices 201C to 205C accept the execution of face authentication.

Figure 9:
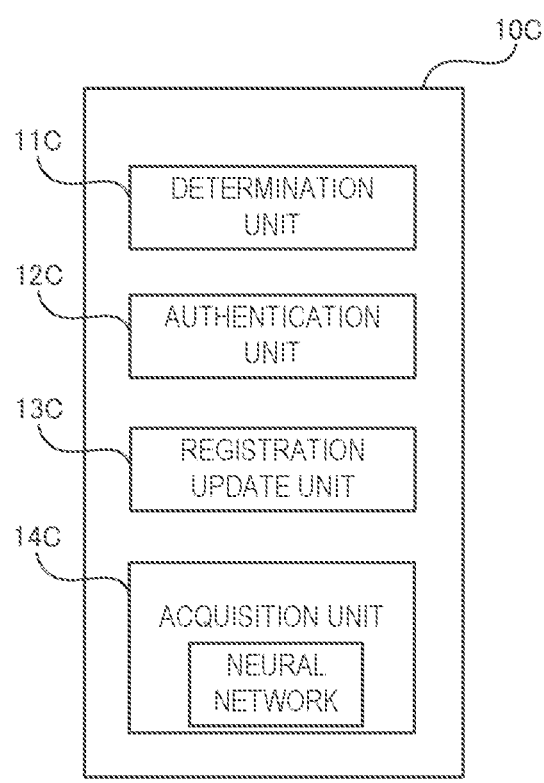
FIG. 9 is a functional block diagram showing a configuration of a server device corresponding to at least one of the embodiments of the present disclosure.

FIG. 9 is a block diagram showing a configuration of the server device 10C, which is an example of the server device 10. In the example of the present embodiment, the server device 10C includes at least a determination unit 11C, an authentication unit 12C, a registration update unit 13C, and an acquisition unit 14C.

The determination unit 11C determines the face information used for face authentication from among a plurality of face information registered in the storage unit based on the position estimation information and predetermined conditions. Specifically, the determination unit 11C determines face information remaining after excluding face information in which predetermined conditions are satisfied from among the plurality of face information registered in the storage unit as the face information to be used for the face authentication. The position estimation information of the example of the present embodiment is included in the registration data as shown in FIG. 10, and is associated with each of the plurality of face information. FIG. 10 is a diagram showing an example of registration data used for face authentication. The registration data is stored in the storage unit of the server device 10C.

The registration data is configured by fields such as a user ID, a name, face information, a ticket type, a first imaging time, and a first imaging position. Information of one user is registered in one record. The position estimation information corresponds to the ticket type of the registration data, the first imaging position, and the first imaging time. For example, information on thousands of users is registered in the registration data.

Identification information of a user is registered in a user ID field. Text data of a name of a user is registered in a name field. Face information (numerical value) acquired from a face image of a user is registered in a face information field. The face information is information on a face image, such as a position of feature points such as eyes, nose, and mouth of the face in the face image, a feature amount such as a distance between feature points, and a feature vector of the face image, for example.

In the ticket type field, type information (identification information) of the ticket purchased by the user is registered. In addition, in the ticket type shown in FIG. 10, the description of the ticket type is described for convenience of explanation. In fields of the first imaging time and the first imaging position, a position and a time at which the face image of the user was last captured are registered. In the example of the present embodiment, the position and the time at which the face image was last captured by either face registration or face authentication is registered as the first imaging time and the first imaging position. In the field of the first imaging position, the identification information of the terminal device on which the face image is captured is registered. For example, in a case of a user (user ID: 0005), it is specified that the face image was, for face registration or face authentication, last captured by the terminal device 20C at 10:00.

Next, predetermined conditions will be described. The predetermined conditions of the example of the present embodiment include the following condition (1) and condition (2).

Condition (1): A user whose face image has captured at the first imaging position at the first imaging time cannot move to a second imaging position by a second imaging time when a position and a time at which a face image as a target of the face authentication is captured are defined as the second imaging position and the second imaging time.

Condition (2): It is the ticket type which is estimated not to be at the position at which a face image as a target of the face authentication is captured.

The determination unit 11C determines face information remaining after excluding face information for which at least one of the above condition (1) and condition (2) is satisfied from among the plurality of face information registered in the storage unit as the face information to be used for the face authentication.

Regarding movement under the condition (1), the required time data as shown in FIG. 11 is referred to. The required time data is data of the estimated time required for the user to move between two points. The required time data is stored in the storage unit of the server device 10C. The required time data is configured by fields such as a device ID-1, a device ID-2, and required time. The fields of the device ID-1 and the device ID-2 indicate two points. The identification information of any of the terminal devices 20C and 201C to 205C is set in the fields of the device ID-1 and the device ID-2. In the required time field, a required time between the two points of the device ID-1 and the device ID-2 is set. The required time is a required time for one-way movement between two points. In addition, in the amusement park 300, the user can move only on foot. Therefore, the required time estimated by walking (running) movement is set in the required time field. For the above required time, for example, the time is set which is required no matter how fast the movement is. When the user can move between two points on a ship, train, automobile, or the like, the required time estimated when using the ship, the train, the automobile, or the like, may be set in the required time field.

Next, regarding the condition (2), the ticket that permits only entrance into the facility and the ticket that permits unlimited use of specific attractions 80C to 82C satisfy the condition (2). For example, a user having the ticket that permits only entrance into the facility does not basically move to the terminal devices 201C to 205C disposed in the attractions 80C to 84C. This is since the above user cannot ride the attractions 80C to 84C. In addition, a user having the ticket that permits unlimited use of specific attractions 80C to 82C does not basically move to the terminal devices 204C and 205C disposed in the attractions 83C and 84C. This is since the user cannot ride the attractions 83C and 84C.

For example, a case where face authentication of the user A1 is performed from now on immediately after the face image of the user A1 (refer to FIG. 8) is captured by the terminal device 205C at 11:00. In this case, the second imaging position is the terminal device 205C, and the second imaging time is 11:00.

A user having a registration data user ID: 0001 shown in FIG. 10 has a first imaging time at 10:20 and a first imaging position at the terminal device 20C. As shown in FIG. 11, a required time for moving from the terminal device 20C to the terminal device 205C is 5 minutes. Therefore, it is determined that the user having the user ID: 0001 can move from the state of being in the terminal device 20C at 10:20 to the terminal device 205C at 11:00. Therefore, the condition (1) is not satisfied. However, in the ticket type of the user having the user ID: 0001, the ticket that permits only entrance into the facility is registered. Therefore, the condition (2) is satisfied. Therefore, the determination unit 11C excludes the face information of the user ID: 0001 from the face authentication target of the user A1. For example, the determination unit 11C may additionally set the user ID: 0001 in the storage unit as exclusion information.

Next, for example, a user with a registration data user ID: 0002 has a first imaging time at 10:59 and a first imaging position at the terminal device 201C. A required time for moving from the terminal device 201C to the terminal device 205C is 15 minutes. Therefore, it is determined that the user having the user ID: 0002 cannot move from the state of being in the terminal device 201C at 10:59 to the terminal device 205C at 11:00. Therefore, the condition (1) is satisfied. Therefore, the determination unit 11C excludes the face information of the user ID: 0002 from the face authentication target of the user A1. For example, the determination unit 11C may additionally set the user ID: 0002 in the storage unit as exclusion information. The ticket type of the user having the user ID: 0002 is set to a ticket that permits unlimited use of all attractions 80C to 84C. Therefore, the condition (2) is not satisfied.

In addition, for example, a user having a registration data user ID: 0005 has a first imaging time at 10:00 and a first imaging position at the terminal device 20C. A required time for moving from the terminal device 20C to the terminal device 205C is 5 minutes. Therefore, it is determined that the user having the user ID: 0005 can move from the state of being in the terminal device 20C at 10:00 to the terminal device 205C at 11:00. Therefore, the condition (1) is not satisfied. Further, the ticket type of the user having the user ID: 0005 is set to a ticket that permits unlimited use of all attractions 80C to 84C. Therefore, the condition (2) is also not satisfied. Accordingly, the determination unit 11C sets the face information of the user ID: 0005 as a target of the face authentication of the user A1 (do not set as exclusion information).

As described above, the determination unit 11C refers to each position estimation information (ticket type, first imaging time, and first imaging position) of the registration data, and determines the feasibility of the condition (1) and condition (2). Then, among the plurality of face information of the registration data, face information remaining after excluding face information of a user ID set as the exclusion information is determined as the face information used for the face authentication.

Next, the authentication unit 12C executes the face authentication using the face information determined by the determination unit 11C on the face image of the user captured for the face authentication in the terminal devices 20C and 201C to 205C. That is, the authentication unit 12C determines (authenticates) whether or not the user of the captured face image is the user whose face information is registered, thereby determining whether or not the user can enter the facility and whether or not the user can use (ride) the attraction.

When the face image of the user captured for face authentication is authenticated by the terminal device 20C, entrance to the facility is permitted. When the face image of the user captured for face authentication is authenticated by the terminal devices 201C to 205C, the use (riding) of the attraction is permitted.

The authentication unit 12C acquires the face information of the captured face image of the user from the acquisition unit 14C, and performs the face authentication by collating with the face information determined by the determination unit 11C. The terminal devices 20C and 201C to 205C transmit information for face authentication such as the face image of a user who has accepted the execution of the face authentication, and the imaging time (second imaging time) and the imaging position (second imaging position) of the face image to the server device 10C together with the face authentication request.

Next, the registration update unit (registration update function) 13C newly registers the face information of the face image of the user captured for the face registration in the terminal device 20C in the registration data. Specifically, the registration update unit 13C newly registers the user ID, name, face information, ticket type, and one record of first imaging time and first imaging position in the registration data. The terminal device 20C transmits information for face registration such as a name and a face image of a user who has accepts the execution of face registration, and an imaging time (first imaging time) and an imaging position (first imaging position) of the face image to the server device 10C together with the face registration request. The registration update unit 13C refers to the information for face registration received from the terminal device 20C, and newly registers one record in the registration data. The registration update unit 13C acquires the face information of the face image received from the terminal device 20C from the acquisition unit 14C. In addition, the registration update unit 13C newly generates a user ID for new registration.

When the captured face image of the user is authenticated by the face authentication, the registration update unit 13C updates the position estimation information (the first imaging time and the first imaging position) of the registration data of the user of the face image to the information on a point in time at which the face image is captured. For example, in the face authentication of the user A1 in the above example, a case will be described in which the face image of the user A1 captured by the terminal device 205C at 11:00 is authenticated as matching with the face information of a user ID: 0006 in the registration data exemplified in FIG. 10. In this case, the server device 10C has received information for face authentication such as the face image of the user A1, and the imaging time (11:00) and the imaging position (terminal device 205C) of the face image from the terminal device 205C together with the face authentication request. The registration update unit 13C updates the first imaging time and the first imaging position of the user ID: 0006 to the imaging time (11:00) and the imaging position (terminal device 205C) received from the terminal device 205C.

Next, the acquisition unit 14C acquires (extracts) the face information from the face image in face authentication and face registration. The acquisition unit 14C acquires face information using a learned model obtained by machine learning using a face image. For the learned model, for example, a neural network is used. A face image is input to the neural network. In addition, the neural network outputs face information of the input face image. The input face image may be a face image captured by the terminal devices 20C and 201C to 205C, or a face image obtained by performing various processing such as filtering on the captured face image. Even the face image subjected to various processing corresponds to the face image captured by the terminal devices 20C and 201C to 205C.

The learned model (neural network) of the example of the present embodiment is generated by inputting many face images (learning data) in advance and performing the machine learning (for example, deep learning). The learned model (neural network) may be learned (additional learning) by inputting a face image as a target of face registration and face authentication at the amusement park 300. In addition, a configuration that does not use the learned model may be adopted for acquiring the face information.

Figure 12:
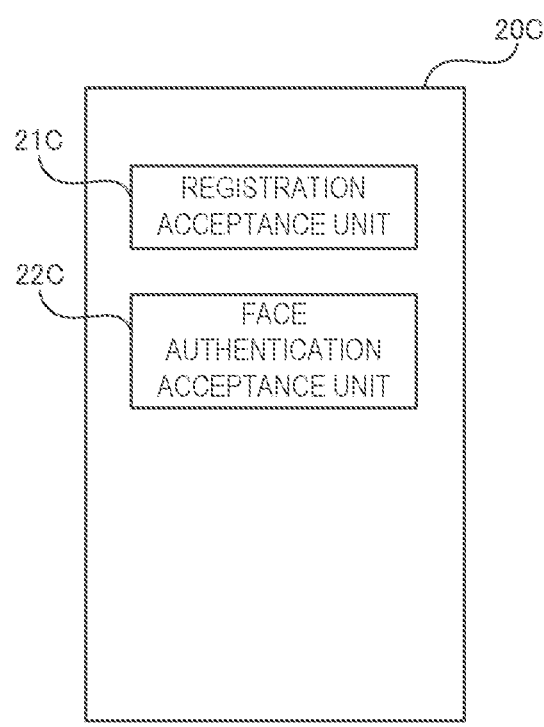
FIG. 12 is a functional block diagram showing a configuration of a terminal device corresponding to at least one of the embodiments of the present disclosure.

FIG. 12 is a block diagram showing a configuration of the terminal device 20C, which is an example of the terminal device 20. In the example of the present embodiment, the terminal device 20C includes at least a registration acceptance unit 21C and a face authentication acceptance unit 22C. The terminal devices 201C to 205C have the same configuration as the terminal devices 20C, but do not have the registration acceptance unit 21C.

The registration acceptance unit 21C accepts the execution of face registration from the user. The user may, for example, operate the operation unit of the terminal device 20C and select the execution of face registration. The registration acceptance unit 21C causes the imaging unit to capture the face image of the user. In addition, the registration acceptance unit 21C causes the user to operate the operation unit to input the name of the user and the ticket type. Thereafter, the registration acceptance unit 21C transmits information for face registration such as the name and the face image of the user, the ticket type, and the imaging time (first imaging time) and the imaging position (first imaging position) of the face image to the server device 10C together with the face registration request. When the terminal device 20C receives the completion of face registration from the server device 10C, the terminal device 20C displays the entrance permission to the facility.

The face authentication acceptance unit 22C accepts the execution of face authentication from the user. The user may, for example, operate the operation unit of the terminal device 20C and select the execution of face authentication. The face authentication acceptance unit 22C causes the imaging unit to capture the face image of the user. Thereafter, the face authentication acceptance unit 22C transmit information for face authentication such as the face image of a user, and the imaging time (second imaging time) and the imaging position (second imaging position) of the face image to the server device 10C together with the face authentication request. The second imaging position is the identification information of the terminal device 20C. When the authentication result is received from the server device 10C, the terminal device 20C displays the entrance permission to the facility. In the terminal devices 201C to 205C, when the authentication result is received from the server device 10C, use permission of the attractions 80C to 84C is displayed.

Next, an operation of the face authentication system 100C will be described.

Figure 13:
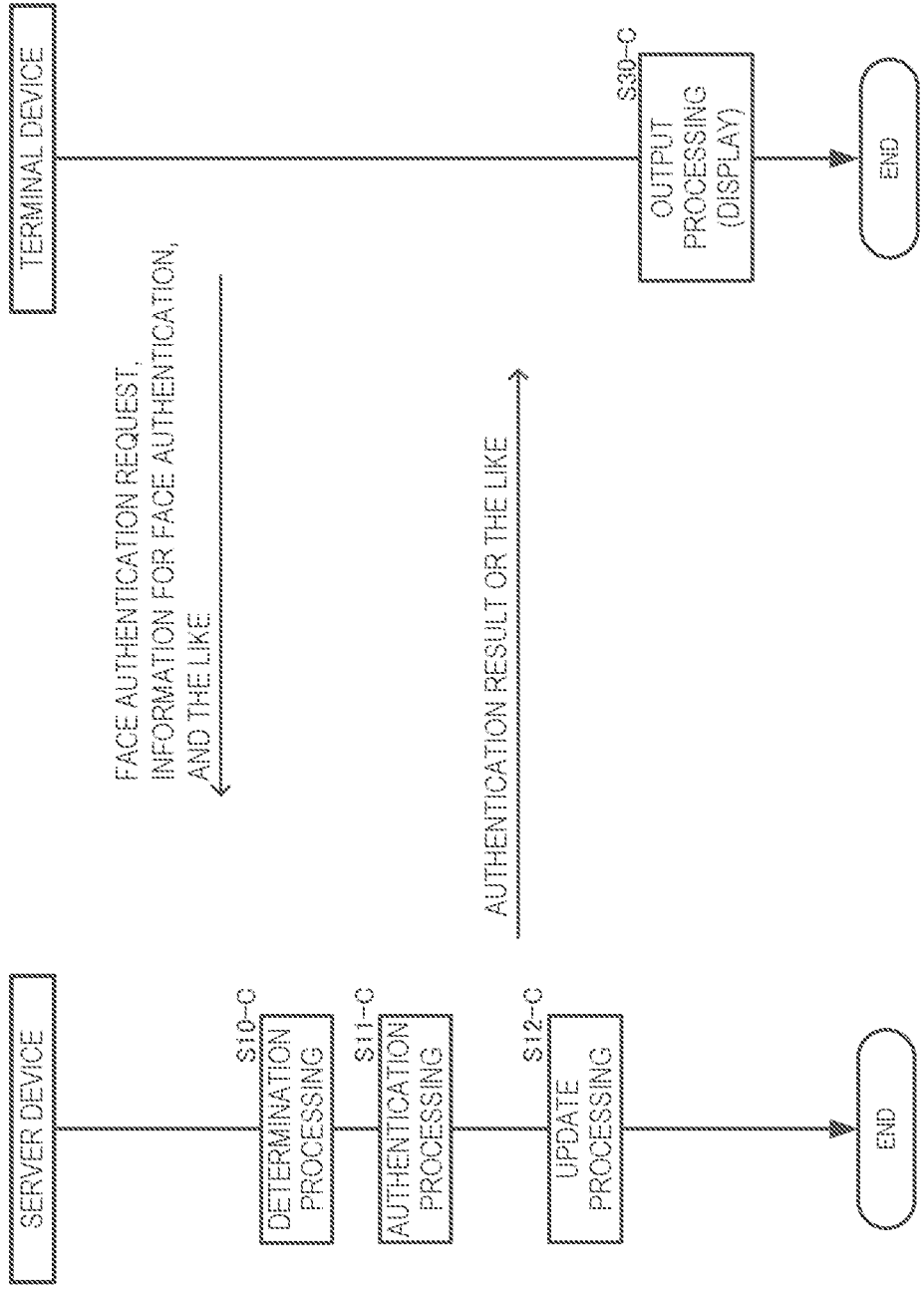
FIG. 13 is a flowchart showing an example of face authentication processing corresponding to at least one of the embodiments of the present disclosure.

FIG. 13 is a flowchart showing an example of face authentication processing executed by the face authentication system 100C. In the face authentication processing in the example of the present embodiment, processing for determining face information used for face authentication and executing the face authentication is performed. FIG. 13 mainly describes processing of determining face information and processing of collating face information, and some other processing may be omitted. Hereinafter, a case where the server device 10C and the terminal device 20C execute the authentication processing will be described as an example.

The face authentication processing of the example of the present embodiment is executed when, for example, the face authentication request is received from any of the terminal devices 20C and 201C to 205C.

The terminal device 20C transmits information for face authentication such as a face image of a user, and a second imaging time and a second imaging position (identification information of the terminal device 20C) of the face image to the server device 10C together with the face authentication request.

The server device 10C executes the determination processing (step S10-C). In the determination processing, the face information used for face authentication is determined from among a plurality of face information registered in the storage unit based on the position estimation information (ticket type, first imaging time, and first imaging position) and predetermined conditions (condition (1) and condition (2)). As described above, the face information remaining after excluding the face information for which the predetermined condition is satisfied is determined as the face information used for the face authentication.

Next, the server device 10C executes the authentication processing (step S11-C). In the authentication processing, the face authentication is executed on the face image received from the terminal device 20C by using the determined face information. That is, the face information of the captured face image is acquired, and it is determined whether or not the acquired face information matches the determined face information. In addition, in the authentication processing, the server device 10C transmits an authentication result and the like of whether or not to permit entrance to the terminal device 20C. The server device 10C transmits an authentication result and the like of whether or not to permit the use (riding) of the attraction to the terminal devices 201C to 205C.

On the other hand, the terminal device 20C outputs (displays on the display unit) an image based on the received authentication result and the like (step S30-C). After that, the terminal device 20C ends the face authentication processing. In addition, the same processing as that of the terminal device 20C is performed in the other terminal devices 201C to 205C.

After that, the server device 10C executes an update processing (step S12-C). In the update processing, position estimation information (first imaging time and first imaging position) associated with the face information (registration data) matching the face image received from the terminal device 20C is updated to the information on a point in time at which the face image received from the terminal device 20C is captured. Specifically, the imaging time and the imaging position, which are the second imaging time and the second imaging position, received from the terminal device 20C are registered in the first imaging time and the first imaging position of the registration data. When it is determined in the authentication processing that the face information of the captured face image does not match any of the determined face information, the position estimation information is not updated in the update processing. After that, the server device 10C ends the face authentication processing.

Figure 14:
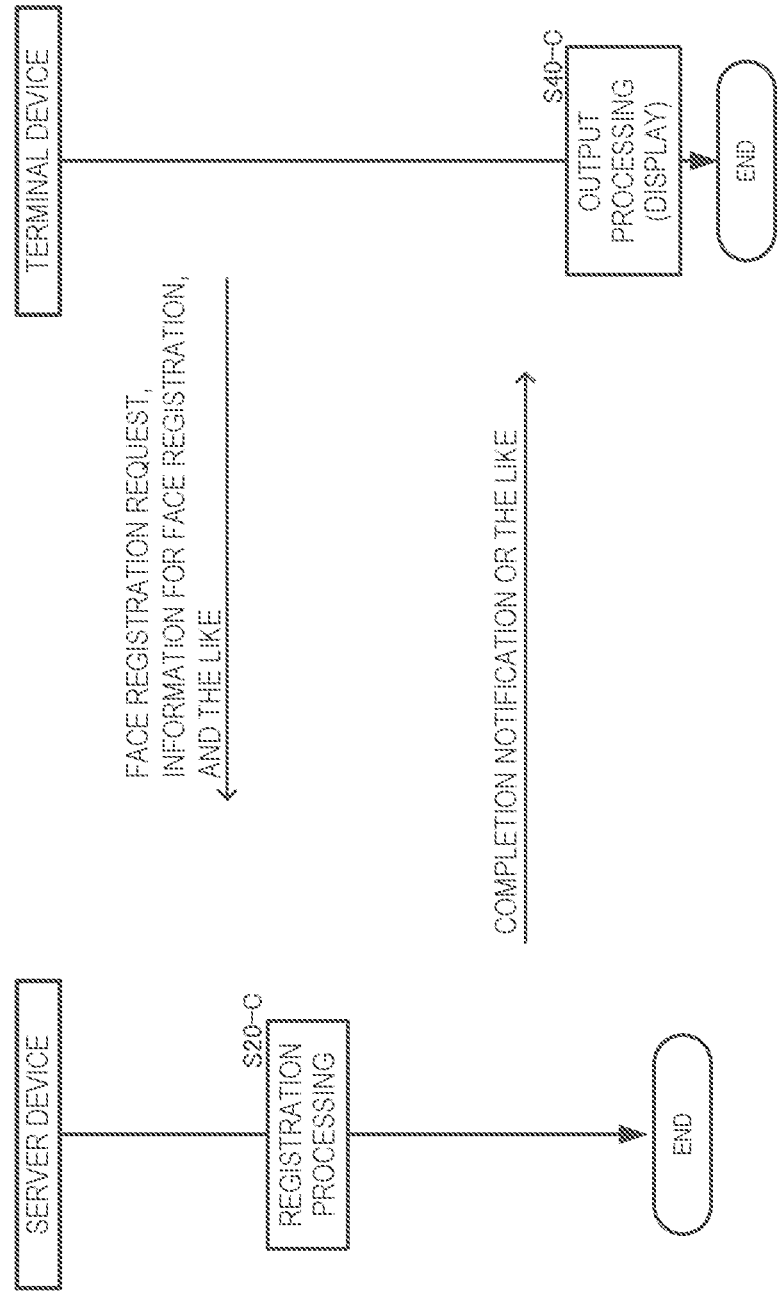
FIG. 14 is a flowchart showing an example of face registration processing corresponding to at least one of the embodiments of the present disclosure.

FIG. 14 is a flowchart showing an example of face registration processing executed by the face authentication system 1000. In the face registration processing in the example of the present embodiment, processing for executing registration of the face information used for face authentication is performed. FIG. 14 mainly describes processing of registering the face information, and some other processing may be omitted.

The face registration processing of the example of the present embodiment is executed when, for example, the face registration request is received from the terminal device 20C.

The terminal device 20C transmits information for face registration such as the name and the face image of the user, the ticket type, and the imaging time (first imaging time) and the imaging position (first imaging position) of the face image to the server device 10C together with the face registration request.

The server device 10C executes the registration processing (step S20-C). In the registration processing, a user ID, a name, face information, a ticket type, and one record of a first imaging time and a first imaging position are newly registered in the registration data. In addition, in the registration processing, the server device 10C transmits a completion notification or the like of the face registration to the terminal device 20C. After that, the server device 10C ends the face registration processing. On the other hand, the terminal device 20C outputs (displays on the display unit) an image based on the received completion notification (step S40-C). After that, the terminal device 20C ends the face registration processing.

As described above, as one aspect of a third embodiment, since the server device 10C is configured to include the determination unit 11C, the authentication unit 12C, the registration update unit 13C, and the acquisition unit 14C, face information used for face authentication is determined based on the predetermined conditions or the like. Accordingly, since face authentication is not performed using all of the plurality of face information registered at all times, the time required for the face authentication is reduced.

Figure 15:
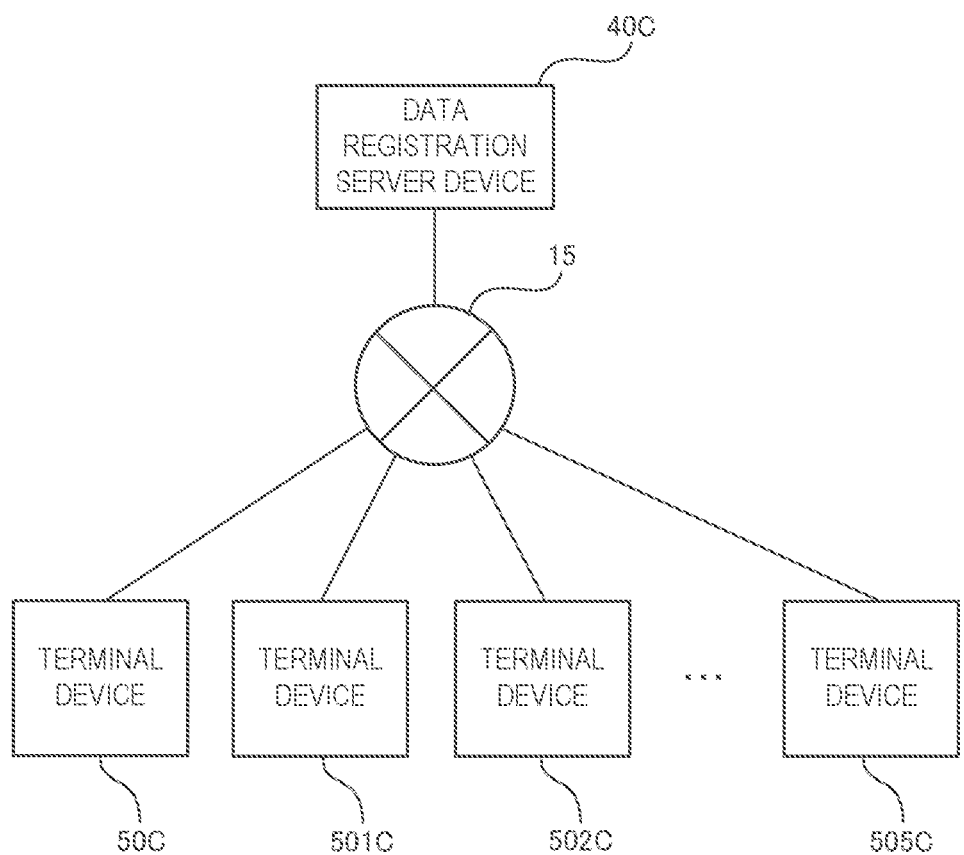
FIG. 15 is a block diagram showing an example of a configuration of a face authentication system corresponding to at least one of the embodiments of the present disclosure.
Figure 16:
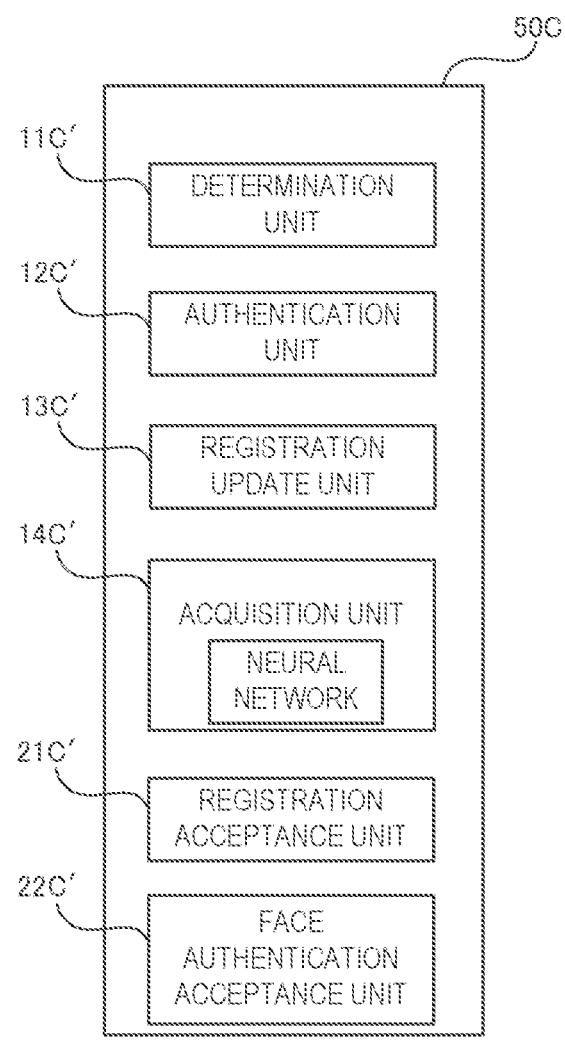
FIG. 16 is a functional block diagram showing a configuration of a terminal device corresponding to at least one of the embodiments of the present disclosure.

In the example of the above-described embodiment, the server device 10C performs face authentication, but the present invention is not particularly limited to this. For example, as shown in FIG. 15, a face authentication system includes a plurality of terminal devices 50C and 501C to 505C, and as shown in FIG. 16, instead of the server device 10C, each of the terminal devices 50C and 501C to 505C may be configured to include at least a determination unit 11C', an authentication unit 12C', a registration update unit 13C', and an acquisition unit 14C' similar to the determination unit 11C, the authentication unit 12C, the registration update unit 13C, and the acquisition unit 14C. FIG. 16 is a functional block diagram of the terminal device 50C.

The terminal devices 50C and 501C to 505C are, for example, personal computers having an imaging unit, as in the above-described terminal devices 20C and 201C to 205C. Each terminal device 50C and 501C to 505C includes the imaging unit, the operation device (operation unit), the storage medium (storage unit), the control unit composed of the CPU, the display unit, the communication control unit, and the like.

In addition, the terminal devices 50C and 501C to 505C are disposed in the amusement park 300 as in the terminal devices 20C and 201C to 205C described above. As in the terminal device 20C, the terminal device 50C also includes a registration acceptance unit 21C' and a face authentication acceptance unit 22C'. Further, the terminal devices 501C to 505C also include a face authentication acceptance unit 22C' as in the terminal devices 201C to 205C.

Software for executing face authentication (face authentication processing program), software for accepting execution of face authentication (face authentication acceptance program), software for accepting execution of face registration (face registration acceptance program), and the like are stored in the storage units of the terminal devices 50C and 501C to 505C. That is, the terminal devices 50C and 501C to 505C accept the execution of face registration and face authentication from the user, and execute the face registration and the face authentication.

The same registration data as a master registration data managed by the data registration server device 40C is registered in the storage units of the terminal devices 50C and 501C to 505C. The data registration server device 40C is connected to the terminal devices 50C and 501C to 505C via a communication network, for example, and registers and updates the master registration data in its own storage unit. The master registration data is the same as the registration data exemplified in FIG. 10. The data registration server device 40C transmits updated information to the terminal devices 50C and 501C to 505C each time the master registration data in the storage unit is updated. The required time data is also stored in the storage units of the terminal devices 50C and 501C to 505C. The data registration server device 40 does not execute the face authentication.

When the execution of face registration is accepted, the registration update unit 13C' transmits the information for face registration to the data registration server device 40C. The data registration server device 40C refers to the received face registration information and updates the registration data. In addition, the registration update unit 13C' transmits the imaging time and the imaging position of the face image to the data registration server device 40C when the face is authenticated by the face authentication. The data registration server device 40C sets the received imaging time and imaging position at the first imaging time and the first imaging position of the registration data.

Figure 17:
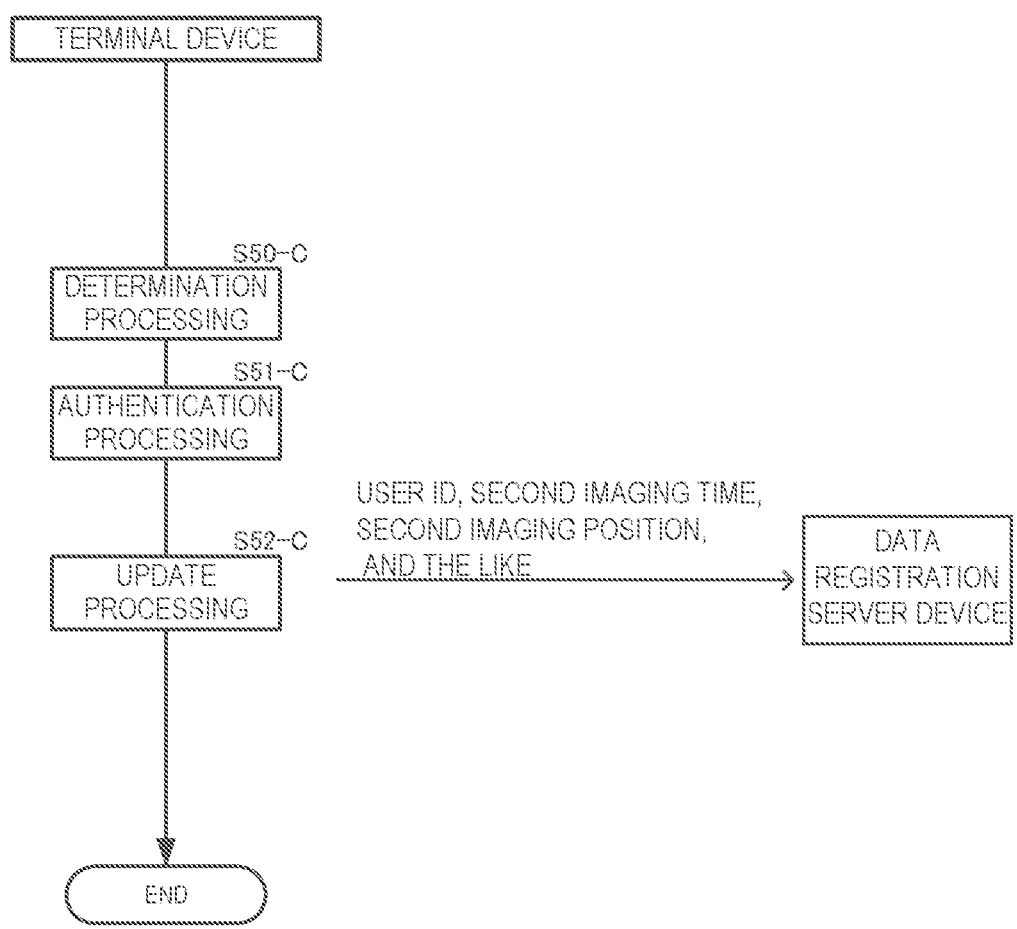
FIG. 17 is a flowchart showing an example of operation of a terminal device when the terminal device corresponding to at least one of the embodiments of the present disclosure executes face authentication processing.

FIG. 17 is a flowchart showing an example of an operation of the terminal device 50C when the terminal device 50C executes the face authentication processing shown in FIG. 13. For example, when the terminal device 50C accepts the execution of the face authentication, the terminal device 50C captures a face image of the user. Then, in addition to the face image, the terminal device 50C acquires information for face authentication such as the second imaging time and the second imaging position (identification information of the terminal device 50C) of the face image.

In the face authentication processing, the terminal device 50C executes a determination processing (step S50-C). In the determination processing, the face information used for face authentication is determined from among a plurality of face information registered in the storage unit based on the position estimation information (ticket type, first imaging time, and first imaging position) and predetermined conditions (condition (1) and condition (2)).

Next, the terminal device 50C executes the authentication processing (step S51-C). In the authentication processing, the face authentication is executed on the face image captured by the terminal device 50C using the determined face information. In addition, in the authentication processing, the terminal device 50C displays an authentication result of whether or not to permits entrance. The terminal devices 501C to 505C display an authentication result and the like of whether or not to permit the use (riding) of the attraction.

After that, the terminal device 50C executes the update processing (step S52-C). In the update processing, position estimation information (first imaging time and first imaging position) associated with the face information (master registration data) matching the captured face image is updated to the information on a point in time at which the face image is captured. Specifically, the terminal device 50C transmits the user ID matching the captured face image, the imaging time and the imaging position which are the second imaging time and the second imaging position of the captured face image to the data registration server device 40. After that, the terminal device 50C ends the face authentication processing. On the other hand, the data registration server device 40 updates the master registration data based on the received information, and transmits the updated information to the terminal devices 50C and 501C to 505C.

Figure 18:
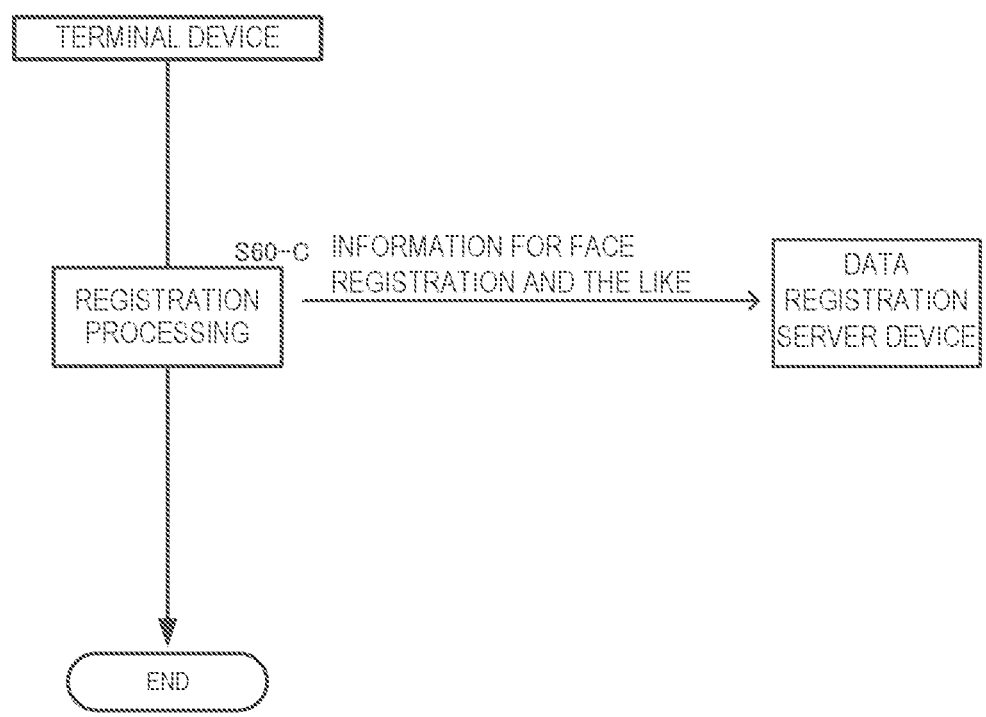
FIG. 18 is a flowchart showing an example of operation of a terminal device when the terminal device corresponding to at least one of the embodiments of the present disclosure executes the face registration processing.

FIG. 18 is a flowchart showing an example of an operation of the terminal device 50C when the terminal device 50C executes the face registration processing shown in FIG. 14. For example, when the terminal device 50C accepts the execution of the face registration, the terminal device 50C captures a face image of the user. Then, in addition to the face image, the terminal device 50C acquires information for face registration such as the first imaging time and the first imaging position (identification information of the terminal device 50C) of the face image.

In the face registration processing, the terminal device 50C executes the registration processing (step S60-C). In the registration processing, a user ID, a name, face information, a ticket type, and one record of a first imaging time and a first imaging position are newly registered in the master registration data. Specifically, the terminal device 50C transmits information for face registration such as the captured face image, a first imaging time, and the first imaging position to the data registration server device 40C. The data registration server device 40C newly generates a user ID and updates the master registration data based on the received information for face registration. Further, in the registration processing, the terminal device 50C outputs (displays on the display unit) an image based on the completion notification or the like received from the data registration server device 40C. After that, the terminal device 50C ends the face registration processing.

In the example of the above-described embodiment, the execution of face registration is accepted only by one terminal device, but the present invention is not particularly limited to this. For example, the face registration may be configured to be accepted by all terminal devices.

In the neural network of the example of the above-described embodiment, the face image is input and the face information is output, but the present invention is not particularly limited to this. For example, a neural network may be allowed to execute the face authentication. In this case, the face information acquired from the captured face image of the user is input to the neural network, and the authentication result is output.

The number of server devices and terminal devices in the above-described embodiment is not particularly limited. Any number can be adopted.

In the embodiment described above, the face information and the position estimation information (ticket type, or the like) are registered as registration data in the same storage unit, but the face information and the position estimation information may be registered in different storage units as long as the face information and the position estimation information are associated with each other. For example, there is a configuration in which the user ID and the face information are associated and registered in the first storage unit, and the user ID and the position estimation information are associated and registered in the second storage unit. In this case, the face information and the position estimation information are associated with each other via the user ID.

Fourth Embodiment

Figure 19:
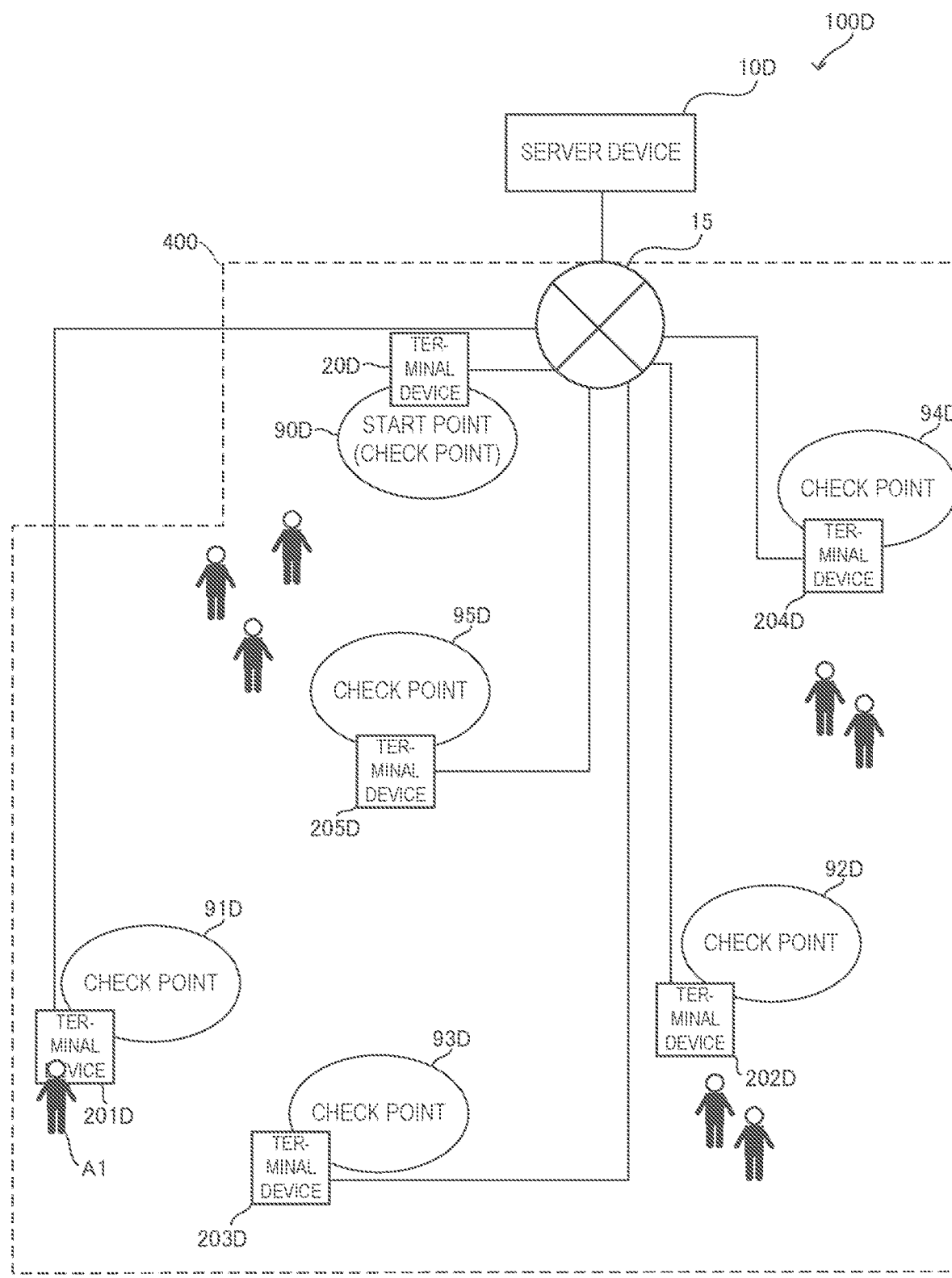
FIG. 19 is a block diagram showing an example of a configuration of a face authentication system corresponding to at least one of the embodiments of the present disclosure.

FIG. 19 is a block diagram showing a configuration of a face authentication system 100D, which is an example of the configuration of the face authentication system 100. In the example of the present embodiment, the face authentication system 100D is disposed in a certain area 400 in the real space. The face authentication system 100D includes a server device 10D and a plurality of terminal devices 20D and 201D to 205D. Each of the server device 10D and the plurality of terminal devices 20D and 201D to 205D are connected to a communication network 15 such as the Internet.

In the example of the present embodiment, a migratory game event is performed in the certain area 400 in the real space. In the migratory game event, the area 400 becomes the game field. The area 400 is, for example, a defined area such as one town or city. A start point 90D and a plurality of check points 91D to 95D are disposed in the area 400. Participants (users) of the game event clear the game by passing all the check points 91D to 95D once from the start point 90D within the time limit. The user should first pass the start point 90D, but a passing order of the other check points 91D to 95D is not set. The user may pass through the check points 91D to 95D in any order. In the example of the present embodiment, the face authentication by the face authentication system 100D is used for authentication of passing check points 91D to 95D except for the start point 90D. In the example of the present embodiment, the game event is executed by, for example, 100 participants. Also, at a game event, the user can retire on the way.

The game field is not limited to the above-described area 400, and may be a randomly determined region of the real space. For example, the whole world may be a game field. In addition, for example, a facility such as an attraction facility or a shopping mall may be used as the game field. Further, in the example of the present embodiment, the user can move by using public transportation such as a bus or a train in addition to walking.

The game event is held at a predetermined date and time (start time: 10:00). Before the start, the user needs to register user own face information (face registration) used for face authentication in advance. The execution of face registration is accepted by the terminal device 20D disposed in the vicinity of the start point 90D. When the user registers the face via the terminal device 20D, it is also registered that the user has passed the start point 90D. That is, when the user registers the face via the terminal device 20D, the face authentication of the user passing through the start point 90D becomes unnecessary. Accordingly, when the user registers the face via the terminal device 20D, the user can move toward each of the check points 91D to 95D after the registration is completed.

In addition, the user can also complete the face registration in advance using its own terminal device such as a smartphone. The user who has registered the face in advance needs to receive the face authentication for passing the check point (start point 90D) in the terminal device 20D before the arrival of the start time. After being authenticated by the face authentication, the user can move towards each of the check points 91D to 95D. That is, the terminal device 20D accepts the execution of face registration and the execution of face authentication.

Terminal devices 201D to 205D are disposed in the vicinity of each of the check points 91D to 95D. The terminal devices 201D to 205D accept the execution of face authentication for passing the check point, as in the terminal devices 20D. The user authenticated by the face authentication has passed the check point of the terminal device in which the execution of face authentication is accepted.

In addition, the terminal devices 20D and 201D to 205D also accept the execution of face authentication for retirement of the game event from the user. The user authenticated by the face authentication for the retirement is registered. That is, the face authentication of the example of the present embodiment includes the face authentication for passing the check point and the face authentication of the retirement. The user may operate the operation units of the terminal devices 20D and 201D to 205D to select whether to execute the face authentication for passing the check point or the face authentication of the retirement.

Figure 20:
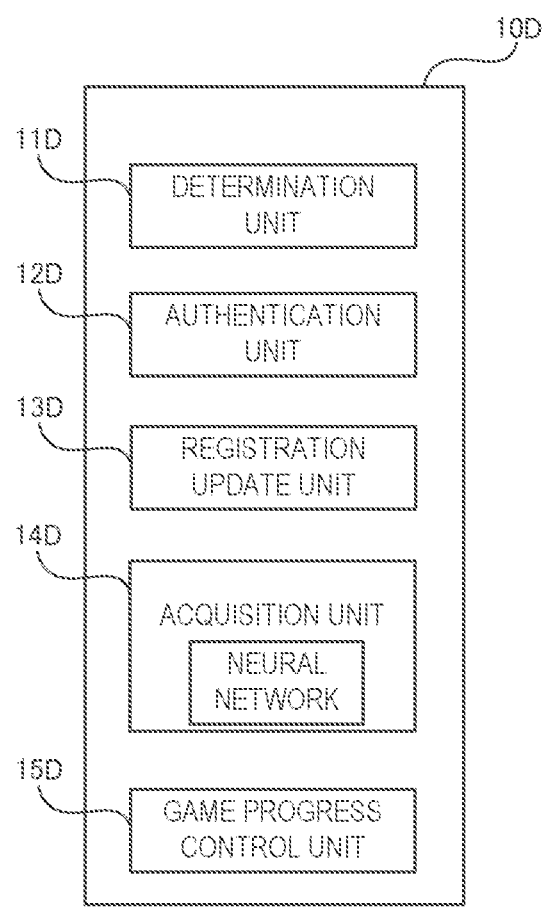
FIG. 20 is a functional block diagram showing a configuration of a server device corresponding to at least one of the embodiments of the present disclosure.

FIG. 20 is a block diagram showing a configuration of the server device 10D, which is an example of the server device 10. In the example of the present embodiment, the server device 10D includes at least a determination unit 11D, an authentication unit 12D, a registration update unit 13D, an acquisition unit 14D, and a game progress control unit 15D.

The determination unit 11D determines the face information used for face authentication from among a plurality of face information registered in the storage unit based on the position estimation information and predetermined conditions. Specifically, the determination unit 11D determines face information remaining after excluding face information in which predetermined conditions are satisfied from among the plurality of face information registered in the storage unit as the face information to be used for the face authentication. The position estimation information of the example of the present embodiment is included in the registration data as shown in FIG. 21, and is associated with each of the plurality of face information. FIG. 21 is a diagram showing an example of registration data used for face authentication. The registration data is stored in the storage unit of the server device 10D.

The registration data is configured by fields such as a user ID, a name, face information, progress, a first imaging time, and a first imaging position. Information of one user is registered in one record. The position estimation information corresponds to the progress of the registration data, the first imaging position, and the first imaging time.

Identification information of a user is registered in a user ID field. Text data of a name of a user is registered in a name field. Face information (numerical value) acquired from a face image of a user is registered in a face information field. The face information is information on a face image, such as a position of feature points such as eyes, nose, and mouth of the face in the face image, a feature amount such as a distance between feature points, and a feature vector of the face image, for example.

A progress status of the game event of the user is registered in a progress field. As the progress status, identification information of passing check points (including the start point), game clearing, and retirement is registered. As the identification information of the passing check point, the identification information of the terminal devices 20D and 201D to 205D is used. In fields of the first imaging time and the first imaging position, a position and a time at which the face image of the user was last captured are registered. In the example of the present embodiment, the position and the time at which the face image was last captured by either face registration or face authentication is registered. In the field of the first imaging position, the identification information of the terminal device on which the face image is captured is set. For example, in the case of the user (user ID: 0005), the face image is last captured by the terminal device 20D at 9:45 for face registration (or face authentication). Further, only the identification information of the terminal device 20D is registered in the progress of the user ID: 0005. Accordingly, the user (user ID: 0005) is in a state in which none of the check points 91D to 95D has passed except for the start point 90D.

Next, predetermined conditions will be described. The predetermined conditions of the example of the present embodiment include the following condition (1) and condition (2).

Condition (1): A user whose face image has captured at the first imaging position at the first imaging time cannot move to a second imaging position by a second imaging time when a position and a time at which a face image as a target of the face authentication is captured are defined as the second imaging position and the second imaging time.

Condition (2): It is the progress of the game event which is estimated not to be at the position at which a face image as a target of the face authentication is captured.

The determination unit 11D determines face information remaining after excluding face information for which at least one of the above condition (1) and condition (2) is satisfied from among the plurality of face information registered in the storage unit as the face information to be used for the face authentication.

Regarding movement under the condition (1), the required time data as shown in FIG. 22 is referred to. The required time data is data of the estimated time required for the user to move between two points. The required time data is stored in the storage unit of the server device 10D. The required time data is configured by fields such as a device ID-1, a device ID-2, and required time. The fields of the device ID-1 and the device ID-2 indicate two points. The identification information of any of the terminal devices 20D and 201D to 205D is set in the fields of the device ID-1 and the device ID-2. In the required time field, a required time between the two points of the device ID-1 and the device ID-2 is set. The required time is a required time for one-way movement between two points. In addition, the user can move in the game field not only by walking but also by public transportation. Therefore, the required time estimated from walking and using public transportation is set to the required time field. For the above required time, for example, the time is set which is required no matter how fast the movement is.

Next, the condition (2) is satisfied when retirement or game clearing is registered in the progress of the registration data. This is because it is estimated that the retired user and the user who has cleared the game do not exist at the start point 90D and the check points 91D to 95D. Further, in the progress of the registration data, it is also satisfied when the identification information of the same terminal device as the position (terminal device) at which a face image as a target of the face authentication is captured is registered. This is because it is estimated that the user will not return to the check points that have already been passed.

For example, a case where face authentication of the user A1 is performed from now on immediately after the face image of the user A1 (refer to FIG. 19) is captured by the terminal device 201D at 12:00. In this case, the second imaging position is the terminal device 201D, and the second imaging time is 12:00.

The user having the registration data user ID: 0001 has a first imaging time at 10:40 and a first imaging position at the terminal device 205D. A required time for moving from the terminal device 201D to the terminal device 205D is 15 minutes. Therefore, it is determined that the user having the user ID: 0001 can move from the state of being in the terminal device 205D at 10:40 to the terminal device 201D at 12:00. Therefore, the condition (1) is not satisfied. However, the retirement is registered in the progress of the user having the user ID: 0001. Therefore, the condition (2) is satisfied. Therefore, the determination unit 11D excludes the face information of the user ID: 0001 from the face authentication target of the user A1. For example, the determination unit 11D may additionally set the user ID: 0001 in the storage unit as exclusion information.

Next, for example, a user having a registration data user ID: 0003 has a first imaging time at 11:45 and a first imaging position at the terminal device 204D. A required time for moving from the terminal device 204D to the terminal device 201D is 30 minutes. Therefore, it is determined that the user having the user ID: 0003 cannot move from the state of being in the terminal device 204D at 11:40 to the terminal device 201D at 12:00. Therefore, the condition (1) is satisfied. Therefore, the determination unit 11C excludes the face information of the user ID: 0003 from the face authentication target of the user A1. For example, the determination unit 11D may additionally set the user ID: 0003 in the storage unit as exclusion information. The identification information of the terminal devices 204D and 205D is registered in the progress of the user having the user ID: 0003. That is, the user having the user ID: 0003 has already passed the check points 94D and 95D. Therefore, the condition (2) is not satisfied.

In addition, for example, the user having the registration data user ID: 0005 has a first imaging time at 9:45 and a first imaging position at the terminal device 20D. A required time for moving from the terminal device 20D to the terminal device 201D is 30 minutes. Therefore, it is determined that the user having the user ID: 0005 can move from the state of being in the terminal device 20D at 9:45 to the terminal device 201D at 12:00. Therefore, the condition (1) is not satisfied. Further, only the identification information of the terminal device 20D is registered in the progress of the user having the user ID: 0005. Therefore, the condition (2) is also not satisfied. Accordingly, the determination unit 11D sets the face information of the user ID: 0005 as a target of the face authentication of the user A1 (do not set as exclusion information).

As described above, the determination unit 11D refers to each position estimation information (progress, first imaging time, and first imaging position) of the registration data, and determines the feasibility of the condition (1) and condition (2). Then, among the plurality of face information of the registration data, face information remaining after excluding face information of a user ID set as the exclusion information is determined as the face information used for the face authentication.

Next, the authentication unit 12D executes the face authentication using the face information determined by the determination unit 11D on the face image of the user captured for the face authentication in the terminal devices 20D and 201D to 205D. That is, the authentication unit 12D determines (authenticates) whether or not the user of the captured face image is the user whose face information is registered, thereby determining whether or not the check point can be passed and whether or not the user can retire.

The authentication unit 12D acquires the face information of the captured face image of the user from the acquisition unit 14D, and performs the face authentication by collating with the face information determined by the determination unit 11D. The terminal devices 20D and 201D to 205D transmit information for face authentication such as the face image of a user from whom the execution of the face authentication has been accepted, and the imaging time (second imaging time) and the imaging position (second imaging position) of the face image to the server device 10D together with the face authentication request.

Next, the registration update unit 13D newly registers the face information of the face image of the user captured for the face registration in the terminal device 20D in the registration data. Specifically, the registration update unit 13D newly registers the user ID, name, face information, progress, and one record of first imaging time and first imaging position in the registration data. The terminal device 20D transmits information for face registration such as a name and a face image of a user from whom the execution of face registration has been accepted, and an imaging time (first imaging time) and an imaging position (first imaging position) of the face image to the server device 10D together with the face registration request. The registration update unit 13D refers to the information for face registration received from the terminal device 20D, and newly registers one record in the registration data. The identification information of the terminal device 20D at the start point 90D is set in the progress. The registration update unit 13D acquires the face information of the face image received from the terminal device 20D from the acquisition unit 14D. In addition, the registration update unit 13D newly generates a user ID for new registration.

When the captured face image of the user is authenticated by the face authentication, the registration update unit 13D updates the position estimation information (the first imaging time and the first imaging position) of the registration data of the user of the face image to the information on a point in time at which the face image is captured. For example, in the face authentication of the user A1 in the above example, a case will be described in which the face image of the user A1 captured by the terminal device 201D at 12:00 is authenticated as matching with the face information of a user ID: 0007 in the registration data exemplified in FIG. 21. In this case, the server device 10D has received information for face authentication such as the face image of the user A1, and the imaging time (12:00) and the imaging position (terminal device 201D) of the face image from the terminal device 201D together with the face authentication request. The registration update unit 13D updates the first imaging time and the first imaging position of the user ID: 0007 to the imaging time (12:00) and the imaging position (terminal device 201D) received from the terminal device 201D.

Next, the acquisition unit 14D acquires (extracts) the face information from the face image in face authentication and face registration. The acquisition unit 14D acquires face information using a learned model obtained by machine learning using a face image. For the learned model, for example, a neural network is used. A face image is input to the neural network. In addition, the neural network outputs face information of the input face image. The input face image may be a face image captured by the terminal devices 20D and 201D to 205D, or a face image obtained by performing various processing such as filtering on the captured face image. Even the face image subjected to various processing corresponds to the face image captured by the terminal devices 20D and 201D to 205D.

The learned model (neural network) of the example of the present embodiment is generated by inputting many face images (learning data) in advance and performing the machine learning (for example, deep learning). The learned model (neural network) may be learned (additional learning) by inputting a face image as a target of face registration and face authentication at the game event. In addition, a configuration that does not use the learned model may be adopted for acquiring the face information.

Next, the game progress control unit 15D controls a progress of the game event. The game progress control unit 15D updates, for example, the start point 90D of each user and a passing results (progress of registration data) of the check points 91D to 95D based on a result of the face authentication for passing the check point. Specifically, the game progress control unit 15D additionally registers identification information of a terminal device in which the face image is captured in the progress (registration data) of the user of the authenticated face image. Further, the game progress control unit 15D additionally registers the identification information of the retirement to the progress of the registration data of each user, for example, based on the result of the face authentication of the retirement.

In addition, when the user passes through all the start point 90D and the check points 91D to 95D, the game progress control unit 15D additionally registers the identification information for the game clearing in the progress of the registration data of the user. The game progress control unit 15D may determine whether or not the game is cleared from setting contents of the progress of the registration data.

Figure 23:
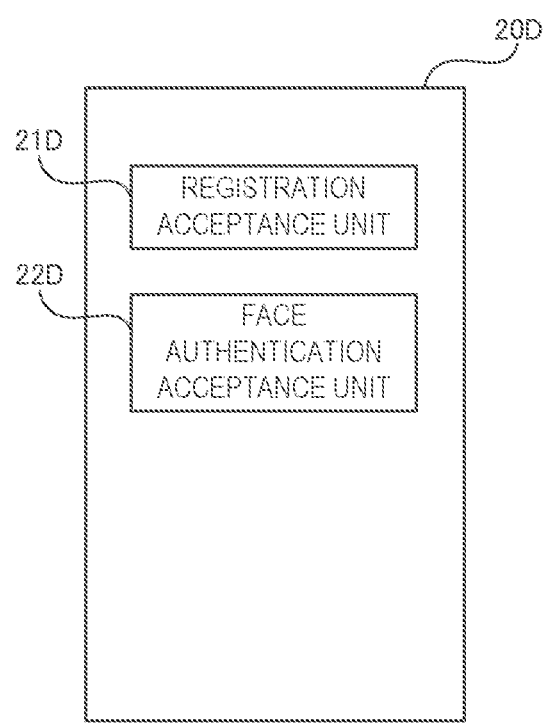
FIG. 23 is a functional block diagram showing a configuration of a terminal device corresponding to at least one of the embodiments of the present disclosure.

FIG. 23 is a block diagram showing a configuration of the terminal device 20D, which is an example of the terminal device 20. In the example of the present embodiment, the terminal device 20D includes at least a registration acceptance unit 21D and a face authentication acceptance unit 22D.

The terminal devices 201D to 205D have the same configuration as the terminal devices 20D, but do not have the registration acceptance unit 21D. The registration acceptance unit 21D accepts the execution of face registration from the user. The user may, for example, operate the operation unit of the terminal device 20D and select the execution of face registration. The registration acceptance unit 21D causes the imaging unit to capture the face image of the user. In addition, the registration acceptance unit 21D causes the user to operate the operation unit to input the name of the user. Thereafter, the registration acceptance unit 21D transmits information for face registration such as the name and the face image of the user, and the imaging time (first imaging time) and the imaging position (first imaging position) of the face image to the server device 10D together with the face registration request. When the terminal device 20D receives the completion of face registration from the server device 10D, the terminal device 20D displays the face registration completion.

The face authentication acceptance unit 22D accepts the execution of face authentication from the user. As described above, the execution of the face authentication for passing the check point and the execution of the face authentication of the retirement are accepted. For example, the user may operate the operation unit of the terminal device 20D to select the desired execution of face authentication. In the case of executing of the face authentication for passing the check point, the face authentication acceptance unit 22D causes the imaging unit to capture the face image of the user. Thereafter, the face authentication acceptance unit 22D transmit information for face authentication such as the face image of a user, and the imaging time (second imaging time) and the imaging position (second imaging position) of the face image to the server device 10D together with the face authentication request for passing the check point. The second imaging position is the identification information of the terminal device 20D. When receiving the result of authenticating the face image from the server device 10D, the terminal device 20D displays that the passing of the check point is authenticated (permitted).

When executing the face authentication of the retirement, the face authentication acceptance unit 22D causes the imaging unit to capture the face image of the user. Thereafter, the face authentication acceptance unit 22D transmits information for face authentication such as the face image of a user, and the imaging time (second imaging time) and the imaging position (second imaging position) of the face image to the server device 10D together with the face authentication request for the retirement. When receiving the result of authenticating the face image from the server device 10D, the terminal device 20D displays that the retirement is permitted.

Next, an operation of the face authentication system 100D will be described.

Figure 24:
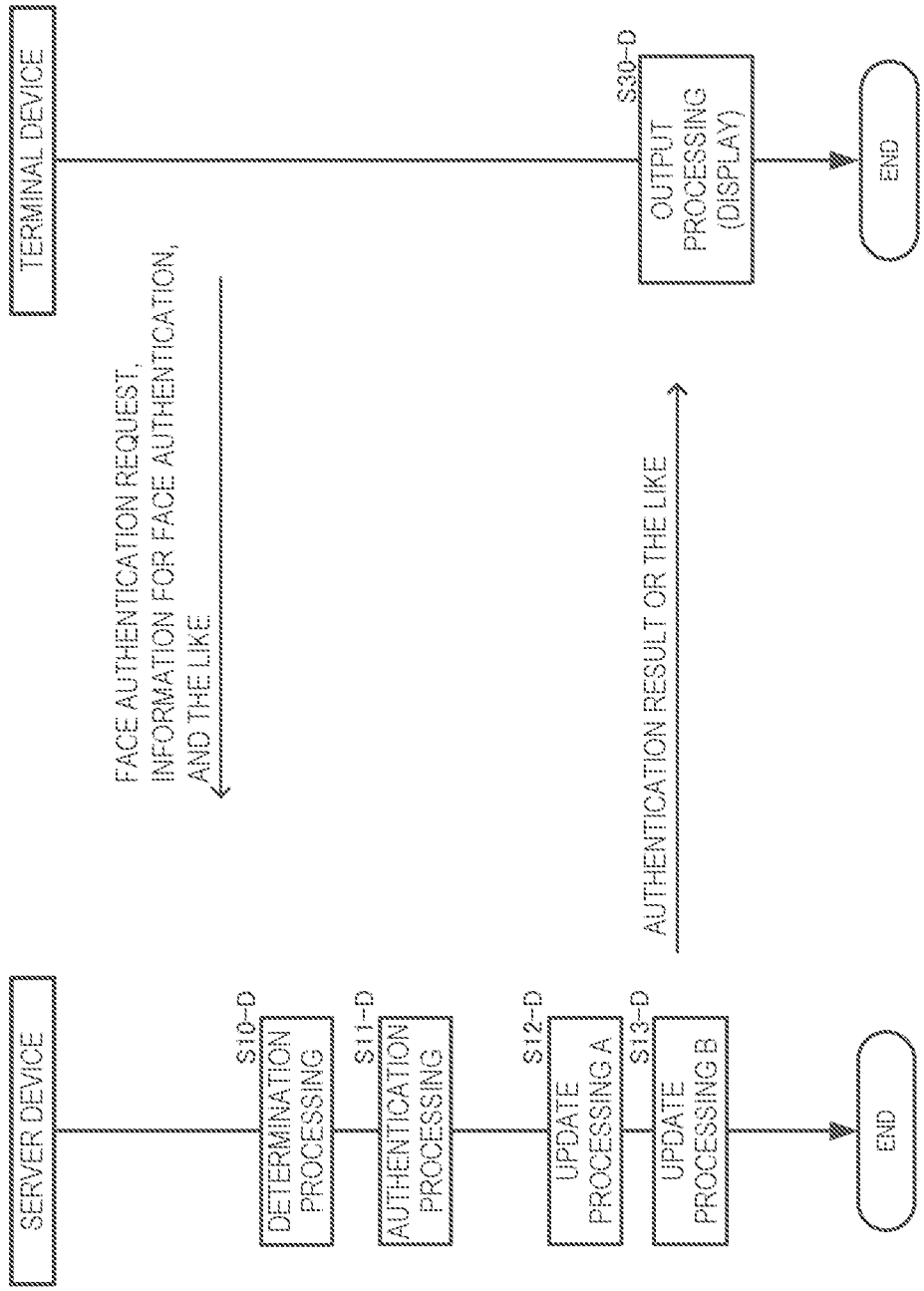
FIG. 24 is a flowchart showing an example of face authentication processing corresponding to at least one of the embodiments of the present disclosure.

FIG. 24 is a flowchart showing an example of face authentication processing executed by the system 100D. In the face authentication processing in the example of the present embodiment, processing for determining face information used for face authentication and executing the face authentication is performed. FIG. 24 mainly describes processing of determining face information and processing of collating face information, and some other processing may be omitted. Hereinafter, a case where the server device 10D and the terminal device 20D execute the authentication processing will be described as an example.

The face authentication processing of the example of the present embodiment is executed, for example, when any one of the face authentication request for passing the check point and the face authentication request for the retirement is received from any one of the terminal devices 20D and 201D to 205D.

The terminal device 20D transmits information for face authentication such as a face image of a user, and a second imaging time and a second imaging position (identification information of the terminal device 20D) of the face image to the server device 10D together with the face authentication request.

The server device 10D executes the determination processing (step S10-D). In the determination processing, the face information used for face authentication is determined from among a plurality of face information registered in the storage unit based on the position estimation information (progress, first imaging time, and first imaging position) and predetermined conditions (condition (1) and condition (2)). As described above, the face information remaining after excluding the face information for which the predetermined condition is satisfied is determined as the face information used for the face authentication.

Next, the server device 10D executes the authentication processing (step S11-D). In the authentication processing, the face authentication is executed on the face image received from the terminal device 20D by using the determined face information. That is, the face information of the captured face image is acquired, and it is determined whether or not the acquired face information matches the determined face information.

After that, the server device 10D executes update processing A (step S12-D). In the update processing A, position estimation information (first imaging time and first imaging position) associated with the face information (registration data) matching the face image received from the terminal device 20D is updated to the information on a point in time at which the face image received from the terminal device 20D is captured. Specifically, the imaging time and the imaging position, which are the second imaging time and the second imaging position, received from the terminal device 20D are registered in the first imaging time and the first imaging position of the registration data. When it is determined in the authentication processing that the face information of the captured face image does not match any of the determined face information, the position estimation information is not updated in the update processing A.

Next, the server device 10D executes update processing B (step S13-D), and the progress (registration data) of the game event is updated in the update processing B. Specifically, the progress corresponding to the face information (registration data) matching the face image received from the terminal device 20D is updated. In the face authentication request for passing the check point, the identification information of the terminal device 20D is additionally registered in the progress of the registration data. In addition, when a condition for the game clearing is satisfied, the server device 10D additionally registers the identification information for the game clearing in the progress of the registration data. Further, in the case of the authentication request for the retirement, the identification information of the retirement is additionally registered in the progress of the registration data. When it is determined in the authentication processing that the face information of the captured face image does not match any of the determined face information, the progress of the registration data is not updated in the update processing B.

In addition, in the update processing B, the server device 10D transmits the authentication result to the terminal device 20D. Further, the server device 10D also transmits, for example, the progress status of the game event to the terminal device 20D. After that, the server device 10D ends the face authentication processing.

On the other hand, the terminal device 20D outputs (displays on the display unit) an image based on the received authentication result and the like (step S30-D). After that, the terminal device 20D ends the face authentication processing. In addition, the same processing as that of the terminal device 20D is performed in the other terminal devices 201D to 205D.

Figure 25:
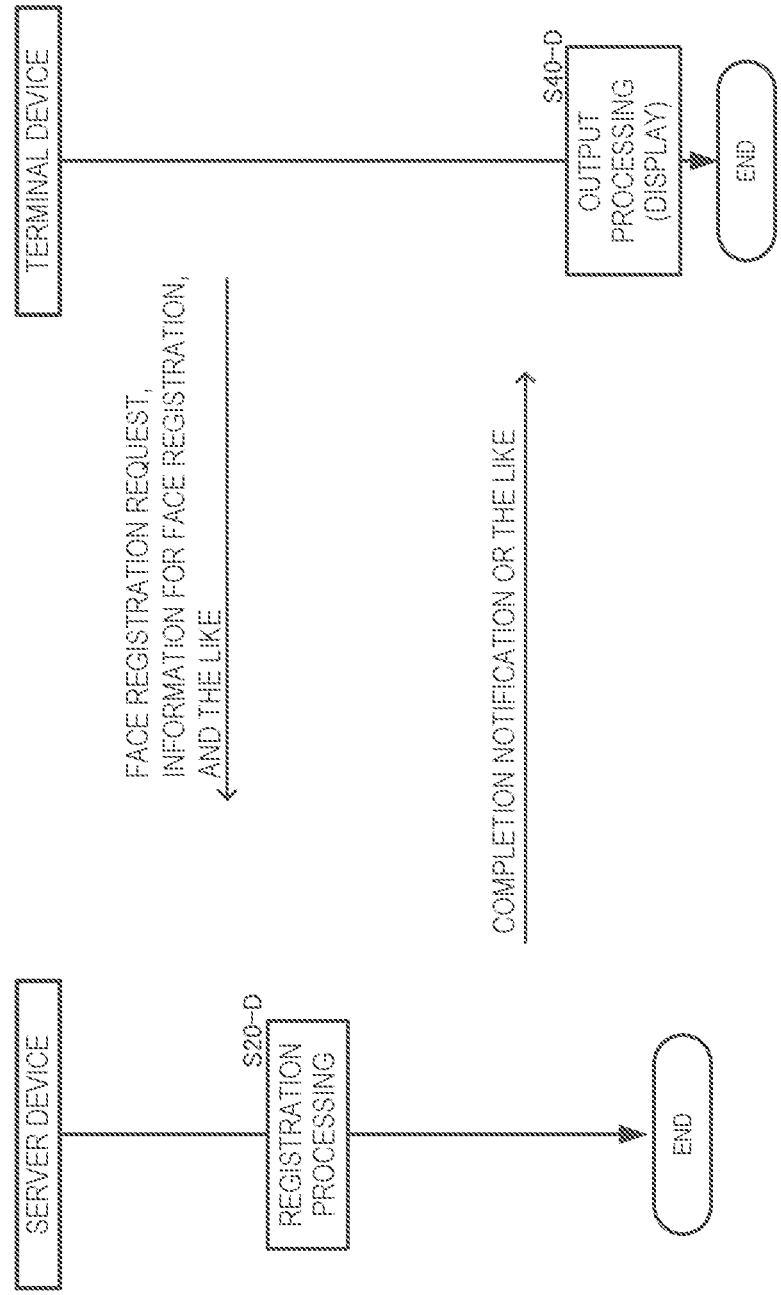
FIG. 25 is a flowchart showing an example of face registration processing corresponding to at least one of the embodiments of the present disclosure.

FIG. 25 is a flowchart showing an example of face registration processing executed by the system 100D. In the face registration processing in the example of the present embodiment, processing for executing registration of the face information used for face authentication is performed. FIG. 25 mainly describes processing of registering the face information, and some other processing may be omitted.

The face registration processing of the example of the present embodiment is executed when, for example, the server device 10D receives a face registration request from the terminal device 20D.

The terminal device 20D transmits information for face registration such as the name and the face image of the user, and the imaging time (first imaging time) and the imaging position (first imaging position) of the face image to the server device 10D together with the face registration request.

The server device 10D executes the registration processing (step S20-D). In the registration processing, a user ID, a name, face information, progress, and one record of a first imaging time and a first imaging position are newly registered in the registration data. The identification information of the terminal device 20D is set in the progress. That is, the passing of the start point 90D is also registered by executing the face registration on the terminal device 20D. In addition, in the registration processing, the server device 10D transmits a completion notification of the face registration to the terminal device 20D. After that, the server device 10D ends the face registration processing. On the other hand, the terminal device 20D outputs (displays on the display unit) an image based on the received completion notification or the like (step S40-D). After that, the terminal device 20D ends the face registration processing.

As described above, as one aspect of a fourth embodiment, since the server device 10D is configured to include the determination unit 11D, the authentication unit 12D, the registration update unit 13D, the acquisition unit 14D, and the game progress control unit 15D, face information used for face authentication is determined based on the predetermined conditions or the like. Accordingly, since face authentication is not performed using all of the plurality of face information registered at all times, the time required for the face authentication is reduced.

In the example of the above-described embodiment, the server device 10D performs face authentication, but the present invention is not particularly limited to this. As exemplified in FIG. 15 and the like of the third embodiment described above, the terminal device may execute face authentication.

In the example of the above-described embodiment, the execution of face registration is accepted only by one terminal device, but the present invention is not particularly limited to this. For example, the face registration may be configured to be accepted by all terminal devices.

In the neural network of the example of the above-described embodiment, the face image is input and the face information is output, but the present invention is not particularly limited to this. For example, a neural network may be allowed to execute the face authentication. In this case, the face information acquired from the captured face image of the user is input to the neural network, and the authentication result is output.

The number of server devices and terminal devices in the above-described embodiment is not particularly limited. Any number can be adopted. For example, two server devices, a server device that controls the progress of the game event and a server device that executes face authentication, may be used.

In the above-described embodiment, the face information and the position estimation information (progress, or the like) are registered as registration data in the same storage unit, but the face information and the position estimation information may be registered in different storage units as long as the face information and the position estimation information are associated with each other.

In the examples of each of the above-described embodiments, the face authentication has been described, but the present invention is not limited to the face authentication. The embodiment of the present invention can be applied to bytemetric authentication for personal identification using human physical features such as fingerprint authentication and iris authentication.

Appendix

The description of the above-described embodiment describes at least the following invention such that a person having ordinary knowledge in the field to which the invention belongs can carry out the invention.

[1]

A face authentication program for causing a computer device that executes face authentication using a plurality of face information registered in a storage unit with respect to a captured face image of a user to implement a determination function of determining face information to be used for the face authentication from among the plurality of face information based on position estimation information of a user corresponding to each of the plurality of face information, which is registered in the storage unit in association with each of the plurality of face information, and a predetermined condition, and an authentication function of performing the face authentication using the determined face information with respect to the captured face image of the user.

[2]

The face authentication program according to [1], in which the predetermined condition is a condition for excluding face information of a user who is estimated not to be at an imaging position at an imaging time of the face image for which the face authentication is performed from a target of the face authentication, and the program causes the computer device to implement, as the determination function, a function of determining face information remaining after excluding the face information satisfying the predetermined condition from among the plurality of face information as the face information to be used for the face authentication.

[3]

The face authentication program according to [2], in which the position estimation information includes information on a first imaging position and a first imaging time, which are a position and a time at which the face image of the user is captured, the predetermined condition includes a condition that a user whose face image has been captured at the first imaging position at the first imaging time cannot move to a second imaging position by a second imaging time when a position and a time at which a face image as a target of the face authentication is captured are defined as the second imaging position and the second imaging time, and the program causes the computer device to implement, as the determination function, a function of acquiring the second imaging position and the second imaging time, and determining face information other than the face information satisfying the predetermined condition from among the plurality of face information as the face information to be used for the face authentication.

[4]

The face authentication program according to any one of [1] to [3], in which the program causes the computer device to implement, as the authentication function, a function of collating a captured face image of a user with the determined face information by inputting the captured face image of the user using a learned model obtained by machine learning using a face image.

[5]

The face authentication program according to [4], in which the machine learning uses deep learning.

[6]

The face authentication program according to any one of [1] to [5], in which the program causes the computer device to further implement a registration update function of updating, when a captured face image of a user is authenticated by the face authentication, the position estimation information associated with the face information corresponding to the face image to information on a point in time at which the face image is captured.

[7]

A server device on which the face authentication program according to any one of [1] to [6] is installed.

[8]

A program for a terminal device for causing a terminal device having an imaging unit to implement an imaging function of capturing a face of a user, and a transmission function of transmitting information of the captured face image of the user to the server device described in [7] connected via a communication network.

[9]

A terminal device having an imaging unit, in which the face authentication program according to any one of [1] to [6] is installed.

[10]

A face authentication program for causing a server device, which is connected to a terminal device having an imaging unit by a communication network to execute face authentication of a user using a plurality of face information registered in a storage unit with respect to a face image of the user captured by the terminal device, the face authentication program causing the server device to implement a determination function that determines face information to be used for the face authentication from among the plurality of face information based on position estimation information of a user corresponding to each of the plurality of face information, which is registered in the storage unit in association with each of the plurality of face information, and a predetermined condition, and an authentication function that performs the face authentication using the determined face information with respect to the captured face image of the user.

[11]

The face authentication program according to [10], in which the predetermined condition is a condition for excluding face information of a user who is estimated not to be at an imaging position at an imaging time of the face image for which the face authentication is performed from a target of the face authentication, and the program causes the computer device to implement, as the determination function, a function of determining face information remaining after excluding the face information satisfying the predetermined condition from among the plurality of face information as the face information to be used for the face authentication.

[12]

The face authentication program according to [11], in which the position estimation information includes information on a first imaging position and a first imaging time, which are a position and a time at which the face image of the user is captured, the predetermined condition includes a condition that a user whose face image has captured at the first imaging position at the first imaging time cannot move to a second imaging position by a second imaging time when a position and a time at which a face image as a target of the face authentication is captured are defined as the second imaging position and the second imaging time, and the program causes the computer device to implement, as the determination function, a function of acquiring the second imaging position and the second imaging time, and determining face information other than the face information satisfying the predetermined condition from among the plurality of face information as the face information to be used for the face authentication.

[13]

The face authentication program according to any one of [10] to [12], in which the program causes the computer device to implement, as the authentication function, a function of collating a captured face image of a user with the determined face information by inputting the captured face image of the user using a learned model obtained by machine learning using a face image.

[14]

The face authentication program according to [13], in which the machine learning uses deep learning.

[15]

The face authentication program according to any one of [10] to [14], in which the program causes the server device to further implement a registration update function of updating, when a captured face image of a user is authenticated by the face authentication, the position estimation information associated with the face information corresponding to the face image to information on a point in time at which the face image is captured.

[16]

A face authentication system including a terminal device having an imaging unit and a server device connected to the terminal device by a communication network, and executing face authentication of a user using a plurality of face information registered in a storage unit with respect to a face image of the user captured by the terminal device, the face authentication system including a decider configured to determine face information to be used for the face authentication from among the plurality of face information based on position estimation information of a user corresponding to each of the plurality of face information, which is registered in the storage unit in association with each of the plurality of face information, and a predetermined condition, and an authenticator configured to perform the face authentication using the determined face information with respect to the captured face image of the user.

[17]

The face authentication system according to [16], in which the predetermined condition is a condition for excluding face information of a user who is estimated not to be at an imaging position at an imaging time of the face image for which the face authentication is performed from a target of the face authentication, and the decider determines face information remaining after excluding the face information satisfying the predetermined condition from among the plurality of face information as the face information to be used for the face authentication.

[18]

The face authentication system according to [17], in which the position estimation information includes information on a first imaging position and a first imaging time, which are a position and a time at which the face image of the user is captured, the predetermined condition includes a condition that a user whose face image has captured at the first imaging position at the first imaging time cannot move to a second imaging position by a second imaging time when a position and a time at which a face image as a target of the face authentication is captured are defined as the second imaging position and the second imaging time, and the decider acquires the second imaging position and the second imaging time, and determines face information other than the face information satisfying the predetermined condition from among the plurality of face information as the face information to be used for the face authentication.

[19]

The face authentication system according to any one of [16] to [18], in which the authenticator collates a captured face image of a user with the determined face information by inputting the captured face image of the user using a learned model obtained by machine learning using a face image.

[20]

The face authentication system according to [19], in which the machine learning uses deep learning.

[21]

The face authentication system according to any one of [16] to [20] further including a registration updater configured to update, when a captured face image of a user is authenticated by the face authentication, the position estimation information associated with the face information corresponding to the face image to information on a point in time at which the face image is captured.

[22]

A terminal device for executing face authentication using a plurality of face information registered in a storage unit with respect to a captured face image of a user, the terminal device including a decider of determining face information to be used for the face authentication from among the plurality of face information based on position estimation information of a user corresponding to each of the plurality of face information, which is registered in the storage unit in association with each of the plurality of face information, and a predetermined condition, and an authenticator of performing the face authentication using the determined face information with respect to the captured face image of the user.

[23]

A face authentication method for causing a computer device to execute face authentication using a plurality of face information registered in a storage unit with respect to a captured face image of a user, the face authentication method including determination processing of determining face information to be used for the face authentication from among the plurality of face information based on position estimation information of a user corresponding to each of the plurality of face information, which is registered in the storage unit in association with each of the plurality of face information, and a predetermined condition, and an authentication processing of performing the face authentication using the determined face information with respect to the captured face image of the user.

[24]

A face authentication method executed by a face authentication system including a terminal device having an imaging unit and a server device connected to the terminal device by a communication network, and executing face authentication of a user using a plurality of face information registered in a storage unit with respect to a face image of the user captured by the terminal device, the face authentication method including determination processing of determining face information to be used for the face authentication from among the plurality of face information based on position estimation information of a user corresponding to each of the plurality of face information, which is registered in the storage unit in association with each of the plurality of face information, and a predetermined condition, and authentication processing of performing the face authentication using the determined face information with respect to the captured face image of the user.

According to one of the embodiments of the present invention, it is useful for reducing the time required for face authentication.

What is claimed is:

1. A non-transitory computer-readable medium storing a face authentication program causing a computer device comprising a storage medium to execute functions, the functions comprising:
    determining one or more first face information to be used for face authentication of a second user among a plurality of first face information registered, in advance, in the storage medium with respect to previously captured face images of a plurality of first users;
    acquiring second face information from a currently captured face image of the second user; and
    performing the face authentication of the second user based on the determined first face information and the acquired second face information, wherein
    determining the first face information to be used for the face authentication of the second user includes:
        determining the first face information based on position estimation information registered, in advance, in the storage medium to be used for estimation of current positions of the first users, the registered position estimation information including first imaging positions and first imaging times of the previously captured face images of the first users;
        estimating the current positions of the first users from the first imaging positions and the first imaging times;
        acquiring a second imaging position and a second imaging time of the currently captured face image of the second user;
        determining one or more of the first users not existing at the second imaging position at the second imaging time based on the estimated current positions;
        excluding the first face information of the determined one or more of the first users from the face authentication of the second user; and
        determining the remaining first face information of the first users as the first face information to be used for the face authentication of the second user.

2. The non-transitory computer-readable medium according to claim 1, wherein
    determining one or more of the first users not existing at the second imaging position at the second imaging time includes determining whether a predetermined condition is satisfied, and
    the predetermined condition includes estimated time required to move between two positions.

3. The non-transitory computer-readable medium according to claim 1, wherein determining one or more of the first users not existing at the second imaging position at the second imaging time includes determining whether a predetermined condition is satisfied, and
    the predetermined condition includes a condition that one or more of the first users are unable to move to the second imaging position by the second imaging time.

4. The non-transitory computer-readable medium according to claim 1, wherein performing the face authentication of the second user includes:
    entering the currently captured face image of the second user;
    collating the currently captured face image of the second user with the determined first face information by using a learned model obtained by machine learning using a plurality of face images.

5. The non-transitory computer-readable medium according to claim 4, wherein the machine learning uses deep learning.

6. The non-transitory computer-readable medium according to claim 1, wherein the functions further comprise:
    determining whether the face image of at least one of the first users matches the face image of the second user based on the determined first face information and the acquired second face information;
    authenticating the second user as the at least one of the first users whose face image matches the face image of the second user; and
    updating the first imaging position and the first imaging time of the position estimation information associated with the at least one of the first users to the second imaging position and the second imaging time of the face image of the authenticated second user.

7. A non-transitory computer-readable medium storing a face authentication program causing a server device comprising a storage medium to execute functions, the functions comprising:
    determining one or more first face information to be used for face authentication of a second user among a plurality of first face information registered, in advance, in the storage medium with respect to previously captured face images of a plurality of first users based on a predetermined condition and position estimation information, wherein the position estimation information is registered, in advance, in the storage medium in association with the first face information, wherein the face images of the first users have been captured by an imaging unit of a terminal device that is configured to connect to the server through a communication network;

acquiring second face information from a currently captured face image of the second user; and performing the face authentication of the second user based on the determined first face information and the acquired second face information, wherein determining the first face information to be used for the face authentication of the second user includes:

determining the first face information based on the registered position estimation information including first imaging positions and first imaging times of the previously captured face images of the first users;

estimating the current positions of the first users from the first imaging positions and the first imaging times;

acquiring a second imaging position and a second imaging time of the currently captured face image of the second user, determining one or more of the first users not existing at the second imaging position at the second imaging time based on the estimated current positions;

excluding the first face information of the determined one or more of the first users from the face authentication of the second user; and determining the remaining first face information of the first users as the first face information to be used for the face authentication of the second user.

8. A face authentication system, comprising:

a terminal device having an imaging unit configured to capture a face image of a user; and a server device including:

a storage medium configured to store:

a plurality of pieces of face information with respect to the face image of the user; and a plurality of pieces of position estimation information of the user associated with the plurality of pieces of face information, wherein the server device is configured to connect to the terminal device through a communication network, and further configured to execute face authentication of a user using the plurality of pieces of face information, by determining one or more face information to be used for face authentication of a second user among a plurality of first face information based on a predetermined condition and position estimation information, wherein the first face information are registered, in advance, in the storage medium with respect to previously captured face images of a plurality of first users;

acquiring second face information from a currently captured face image of the second user; and performing the face authentication of the second user based on the determined first face information and the acquired second face information, wherein determining the first face information to be used for the face authentication of the second user includes:

determining the first face information based on the registered position estimation information including first imaging positions and first imaging times of the previously captured face images of the first users;

estimating the current positions of the first users from the first imaging positions and the first imaging times;

acquiring a second imaging position and a second imaging time of the currently captured face image of the second user;

determining one or more of the first users not existing at the second imaging position at the second imaging time based on the estimated current positions;

excluding the first face information of the determined one or more of the first users from the face authentication of the second user; and determining the remaining first face information of the first users as the first face information to be used for the face authentication of the second user.

* * * * *